US012586337B2

(12) United States Patent
Imamura et al.

(10) Patent No.: US 12,586,337 B2
(45) Date of Patent: Mar. 24, 2026

(54) TARGET DETECTION DEVICE, MACHINE LEARNING IMPLEMENTATION DEVICE, TARGET DETECTION PROGRAM, AND MACHINE LEARNING IMPLEMENTATION PROGRAM

(71) Applicant: MAYEKAWA MFG. CO., LTD.,
Tokyo (JP)

(72) Inventors: Hikaru Imamura, Tokyo (JP); Masaru Tokumoto, Tokyo (JP); Hiroaki Muranami, Tokyo (JP)

(73) Assignee: MAYEKAWA MFG. CO., LTD.,
Tokyo (JP)

( * ) Notice: Subject to any disclaimer, the term of this patent is extended or adjusted under 35 U.S.C. 154(b) by 318 days.

(21) Appl. No.: 18/254,007

(22) PCT Filed: Oct. 13, 2021

(86) PCT No.: PCT/JP2021/037947
§ 371 (c)(1),
(2) Date: May 23, 2023

(87) PCT Pub. No.: WO2022/137748
PCT Pub. Date: Jun. 30, 2022

(65) Prior Publication Data
US 2024/0005624 A1    Jan. 4, 2024

(30) Foreign Application Priority Data

Dec. 23, 2020    (JP) ................................. 2020-213342

(51) Int. Cl.
*G06V 10/143* (2022.01)
*G01N 21/88* (2006.01)
(Continued)

(52) U.S. Cl.
CPC ....... *G06V 10/143* (2022.01); *G01N 21/8851* (2013.01); *G06V 10/60* (2022.01);
(Continued)

(58) Field of Classification Search
None
See application file for complete search history.

(56) References Cited

U.S. PATENT DOCUMENTS

2019/0012579 A1    1/2019  Namiki
2019/0033227 A1    1/2019  Christensen
(Continued)

FOREIGN PATENT DOCUMENTS

JP         H 0285750 A      3/1990
JP         2007024510 A     2/2007
(Continued)

OTHER PUBLICATIONS

Translation of JP 2020-103284 (Year: 2020).*
(Continued)

*Primary Examiner* — Lennin R Rodriguezgonzalez
(74) *Attorney, Agent, or Firm* — Dority & Manning, P.A.

(57)            ABSTRACT

A target detection device includes: a first image acquiring unit configured to acquire a first image depicting a subject, which is generated by irradiating the subject with light belonging to a first wavelength group; a second image acquiring unit configured to acquire a second image depicting the subject, which is generated by irradiating the subject with light belonging to a second wavelength group other than the first wavelength group and having a different wavelength from the light with which the subject has been irradiated to generate the first image; and a target detecting unit configured to detect a target included in the subject using the first image and the second image.

10 Claims, 16 Drawing Sheets

(51) Int. Cl.
    *G06V 10/60*     (2022.01)
    *G06V 10/774*     (2022.01)
    *G06V 20/68*     (2022.01)

(52) U.S. Cl.
    CPC ... *G06V 10/774* *(2022.01); G01N 2021/8887*
               *(2013.01); G06V 20/68 (2022.01); G06V*
                                *2201/07 (2022.01)*

(56)                 References Cited

U.S. PATENT DOCUMENTS

| | | |
|---|---|---|
| 2019/0049357 A1 | 2/2019 | Matsumoto et al. |
| 2020/0219248 A1 | 7/2020 | Kaneko |
| 2020/0334806 A1 | 10/2020 | Hieda et al. |

FOREIGN PATENT DOCUMENTS

| | | |
|---|---|---|
| JP | 2012112688 A | 6/2012 |
| JP | 2015190898 A | 11/2015 |
| JP | 2018066649 A | 4/2018 |
| JP | 2020103284 A | 7/2020 |
| WO | WO 2008/102143 A1 | 8/2008 |

OTHER PUBLICATIONS

International Search Report (with English tranlsation) for Application No. PCT/JP2021/037947, mailed on Dec. 28, 2021, 6 pages.
European Search Report for corresponding Application No. 21909906. 6, dated Sep. 17, 2024, 13 pages.

\* cited by examiner

Figure 9:
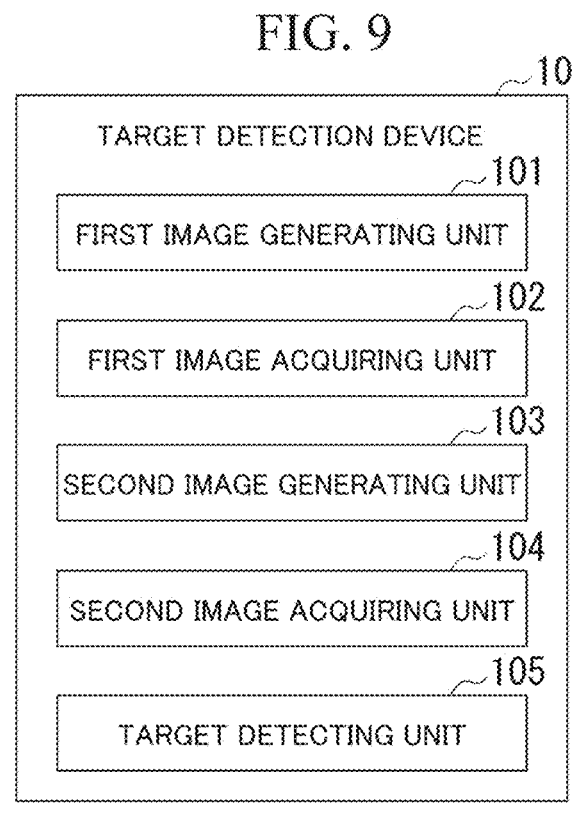

TARGET DETECTION DEVICE

~101

FIRST IMAGE GENERATING UNIT

~102

FIRST IMAGE ACQUIRING UNIT

~103

SECOND IMAGE GENERATING UNIT

~104

SECOND IMAGE ACQUIRING UNIT

~105

TARGET DETECTING UNIT

TARGET DETECTION DEVICE, MACHINE LEARNING IMPLEMENTATION DEVICE, TARGET DETECTION PROGRAM, AND MACHINE LEARNING IMPLEMENTATION PROGRAM

CROSS-REFERENCE TO RELATED APPLICATIONS

The present application is a U.S. national phase of International Patent Application No. PCT/JP2021/037947, filed Oct. 13, 2021, which, in turn, is based upon and claims the right of priority to Japanese Patent Application No. 2020-213342, filed Dec. 23, 2020, the disclosures of both of which are hereby incorporated by reference herein in their entirety for all purposes.

TECHNICAL FIELD

The present invention relates to a target detection device, a machine learning implementation device, a target detection program, and a machine learning implementation program.

Priority is claimed on Japanese Patent Application No. 2020-213342, filed Dec. 23, 2020, the content of which is incorporated herein by reference.

BACKGROUND ART

When foods are handled in a factory or the like, a technique of detecting a specific part included in the foods, foreign matter mixed into the foods, and the like may be needed. For example, a device disclosed in Patent Document 1 can be mentioned as an example of such technology. This device is a device for inspecting an object or a commodity and includes a means configured to illuminate a line crossing the object or the commodity and an observation means configured to observe the whole line or an extension of the line and to detect radiation of a narrow band emitted from a region of a specific object or commodity that is excited by the radiation. An observation system thereof includes a narrow band-pass filter means configured to substantially filter out wavelengths other than the narrow frequency band at a specific incidence angle, a detection means configured to detect radiation passing through the filter means, and a means configured to block light at an angle other than the incidence angle that passes through the filter means and reaches the detection means. Patent Document 1 discloses that this device can be applied to inspect freshness or presence of bones of fish that has been widely cut (using ultraviolet light).

CITATION LIST

Patent Document

[Patent Document 1]
Japanese Unexamined Patent Application, First Publication No. H02-85750

SUMMARY OF INVENTION

Technical Problem

However, since the aforementioned device irradiates a commodity or the like with only a kind of light having a specific spectrum such as ultraviolet light, it may not be able to appropriately detect a specific region included in a commodity or the like, or foreign matter mixed into an object or a commodity, or the like.

For example, when it is intended to irradiate a commodity or the like with X-rays to capture an X-ray image and to detect a target included in the commodity or the like and a difference between the density of the target and the density of surroundings of the target is small, the contrast in luminance between the region in which the target is visualized and the surrounding region in the X-ray image becomes small and the target may not be able to be appropriately detected. Alternatively, when it is intended to irradiate a commodity or the like with excitation light to capture a fluorescent image and to detect a target included in the commodity or the like and an object emitting fluorescence in addition to the target is included therein, the target may not be able to be accurately detected. Alternatively, when it is intended to irradiate a commodity or the like with white light to capture a color image and to detect a target included in the commodity or the like and the target and surroundings of the target are similar in color or shape, the target may not be able to be appropriately detected even using the color image.

The present invention was made in consideration of the aforementioned circumstances and provides a target detection device, a machine learning implementation device, a target detection program, and a machine learning implementation program that can accurately detect a target included in a subject.

Solution to Problem

According to an aspect of the present invention, there is provided a target detection device including: a first image acquiring unit configured to acquire a first image depicting a subject, which is generated by irradiating the subject with light belonging to a first wavelength group; a second image acquiring unit configured to acquire a second image depicting the subject, which is generated by irradiating the subject with light belonging to a second wavelength group other than the first wavelength group and having a different wavelength from the light with which the subject has been irradiated to generate the first image; and a target detecting unit configured to detect a target included in the subject using the first image and the second image.

In the target detection device according to the aspect of the present invention, the target detecting unit detects the target by detecting a first element that is visualized with a luminance higher than a predetermined first luminance in the first image and detecting a second element that is visualized with a luminance higher than a predetermined second luminance in the second image and is different from the first element.

In the target detection device according to the aspect of the present invention, the first image acquiring unit acquires the first image that is generated by irradiating the subject with light having a wavelength whose reflectance is higher than a predetermined first reflectance when the first element is irradiated with the light.

In the target detection device according to the aspect of the present invention, the second image acquiring unit acquires the second image that is generated by irradiating the subject with light having a wavelength whose reflectance is higher than a predetermined second reflectance when the second element is irradiated with the light.

In the target detection device according to the aspect of the present invention, the target detecting unit selects a first point in each region where the first element is visualized in the first image based on a predetermined first rule, selects a second point in each region where the second element is visualized in the second image based on a predetermined second rule, and detects a combination of the first element and the second element that determines the first point and the second point so that the length of a line segment connecting the first point and the second point is less than a predetermined length, as the target.

In the target detection device according to the aspect of the present invention, the first image acquiring unit acquires the first image in which each pixel represents a value calculated based on the luminance of each pixel included in a first main image depicting the subject, which is captured by irradiating the subject with light having a first main wavelength belonging to the first wavelength group and detecting the reflected light, and the luminance of each pixel included in a first subordinate image depicting the subject, which is captured by irradiating the subject with light having a first subordinate wavelength belonging to the first wavelength group and detecting the reflected light.

In the target detection device according to the aspect of the present invention, the second image acquiring unit acquires the second image in which each pixel represents a value calculated based on the luminance of each pixel included in a second main image depicting the subject, which is captured by irradiating the subject with light having a second main wavelength belonging to the second wavelength group and detecting the reflected light, and the luminance of each pixel included in a second subordinate image depicting the subject, which is captured by irradiating the subject with light having a second subordinate wavelength belonging to the second wavelength group and detecting the reflected light.

In the target detection device according to the aspect of the present invention, the first image acquiring unit acquires the first image in which each pixel represents a value calculated based on the luminance of each pixel included in a first main image depicting the subject, which is captured by detecting light having a first main wavelength emitted from the subject by irradiating the subject with light belonging to the first wavelength group, and the luminance of each pixel included in a first subordinate image depicting the subject, which is captured by detecting light having a first subordinate wavelength emitted from the subject by irradiating the subject with light belonging to the first wavelength group.

In the target detection device according to the aspect of the present invention, the second image acquiring unit acquires the second image in which each pixel represents a value calculated based on the luminance of each pixel included in a second main image depicting the subject, which is captured by detecting light having a second main wavelength emitted from the subject by irradiating the subject with light belonging to the second wavelength group, and the luminance of each pixel included in a second subordinate image depicting the subject, which is captured by detecting light having a second subordinate wavelength emitted from the subject by irradiating the subject with light belonging to the second wavelength group.

According to another aspect of the present invention, there is provided a machine learning implementation device including: a training data acquiring unit configured to acquire training data using, as a question, a training multi-channel image that is generated using a first training image depicting a training subject, which is generated by irradiating the training subject with light belonging to a first wavelength group, and a second training image depicting the training subject, which is generated by irradiating the training subject with light belonging to a second wavelength group other than the first wavelength group and having a different wavelength from the light with which the training subject has been irradiated to generate the first training image, and using, as an answer, the position of a region in which a training target included in the training subject depicted in the training multi-channel image is visualized; and a machine learning implementing unit configured to train a machine learning model by inputting the training data to the machine learning model.

According to another aspect of the present invention, there is provided a target detection device including: a first inference image acquiring unit configured to acquire a first inference image depicting an inference subject, which is generated by irradiating the inference subject with light belonging to a first wavelength group; a second inference image acquiring unit configured to acquire a second inference image depicting the inference subject, which is generated by irradiating the inference subject with light belonging to a second wavelength group other than the first wavelength group and having a different wavelength from the light with which the inference subject has been irradiated to generate the first inference image; an inference image generating unit configured to generate an inference multi-channel image using the first inference image and the second inference image; and an inference target detecting unit configured to cause a machine learning model to detect an inference target included in the inference subject by inputting the inference multi-channel image to the machine learning model that have been trained using training data using, as a question, a training multi-channel image that is generated using a first training image depicting a training subject, which is generated by irradiating the training subject with light belonging to the first wavelength group, and a second training image depicting the training subject, which is generated by irradiating the training subject with light belonging to a second wavelength group other than the first wavelength group and having a different wavelength from the light with which the training subject has been irradiated to generate the first training image, and using, as an answer, the position of a region in which a training target included in the training subject depicted in the training multi-channel image is visualized.

According to another aspect of the present invention, there is provided a target detection program causing a computer to perform: a first image acquiring function to acquire a first image depicting a subject, which is generated by irradiating the subject with light belonging to a first wavelength group; a second image acquiring function to acquire a second image depicting the subject, which is generated by irradiating the subject with light belonging to a second wavelength group other than the first wavelength group and having a different wavelength from the light with which the subject has been irradiated to generate the first image; and a target detecting function to detect a target included in the subject using the first image and the second image.

According to another aspect of the present invention, there is provided a machine learning implementation program causing a computer to perform: a training data acquiring function to acquire training data using, as a question, a training multi-channel image that is generated using a first training image depicting a training subject, which is generated by irradiating the training subject with light belonging to a first wavelength group, and a second training image depicting the training subject, which is generated by irradiating the training subject with light belonging to a second wavelength group other than the first wavelength group and having a different wavelength from the light with which the training subject has been irradiated to generate the first training image, and using, as an answer, the position of a region in which a training target included in the training subject depicted in the training multi-channel image is visualized; and a machine learning implementing function to train a machine learning model by inputting the training data to the machine learning model.

According to another aspect of the present invention, there is provided a target detection program causing a computer to perform: a first inference image acquiring function to acquire a first inference image depicting an inference subject, which is generated by irradiating the inference subject with light belonging to a first wavelength group; a second inference image acquiring function to acquire a second inference image depicting the inference subject, which is generated by irradiating the inference subject with light belonging to a second wavelength group other than the first wavelength group and having a different wavelength from the light with which the inference subject has been irradiated to generate the first inference image; an inference image generating function to generate an inference multi-channel image using the first inference image and the second inference image; and an inference target detecting function to cause a machine learning model to detect an inference target included in the inference subject by inputting the inference multi-channel image to the machine learning model, the machine learning model having been trained using training data using, as a question, a training multi-channel image that is generated using a first training image depicting a training subject, which is generated by irradiating the training subject with light belonging to the first wavelength group, and a second training image depicting the training subject, which is generated by irradiating the training subject with light belonging to a second wavelength group other than the first wavelength group and having a different wavelength from the light with which the training subject has been irradiated to generate the first training image, and using, as an answer, the position of a region in which a training target included in the training subject depicted in the training multi-channel image is visualized.

Advantageous Effects of Invention

According to the present invention, it is possible to accurately detect a target included in a subject.

BRIEF DESCRIPTION OF DRAWINGS

FIG. 1 is a diagram illustrating an example of a hardware configuration of a target detection device according to a first embodiment.

FIG. 9 is a diagram illustrating an example of a functional configuration of the target detection device according to the first embodiment.

FIG. 19 is a diagram illustrating an example of a functional configuration of the machine learning implementation device according to the second embodiment.

FIG. 20 is a diagram illustrating an example of a multi-channel image according to the second embodiment.

DESCRIPTION OF EMBODIMENTS

First Embodiment

Figure 2:
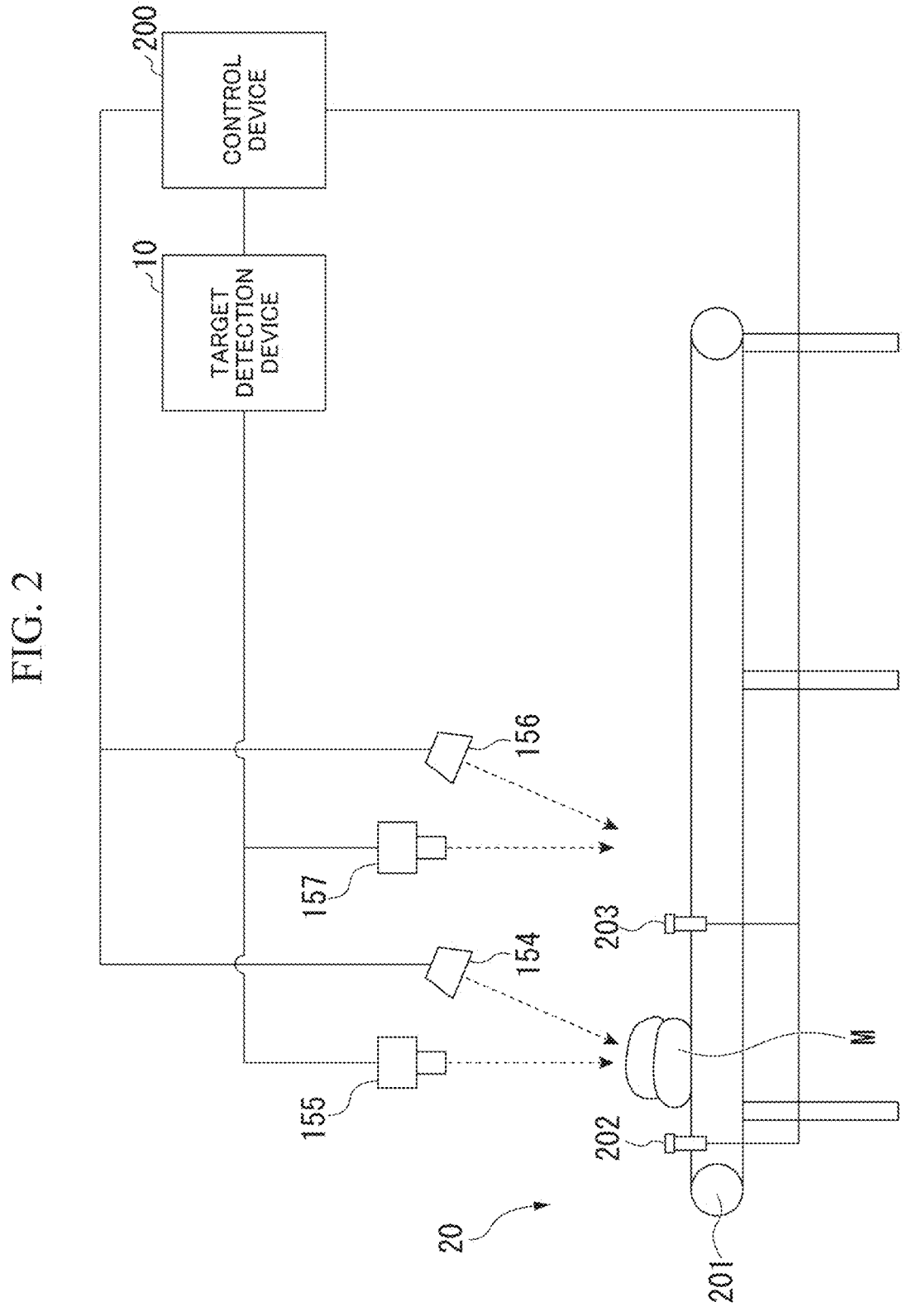
FIG. 2 is a diagram illustrating an example of the target detection device, a first light emitting device, a first imaging device, a second light emitting device, a second imaging device, and a food processing line according to the first embodiment.

A target detection device and a target detection program according to a first embodiment will be described with reference to FIGS. 1 to 17. In the description of the first embodiment, the case in which target detection device detects a knee cartilage part included in a chicken thigh will be used as an example. The knee cartilage part is a part including a combination of cartilage and fat, and is cut off from a chicken thigh, for example, using a knife attached to a tip of an articulated robot.

First, hardware constituting the target detection device according to the first embodiment and hardware accessory to the target detection device will be described with reference to FIGS. 1 to 8.

Figure 1:
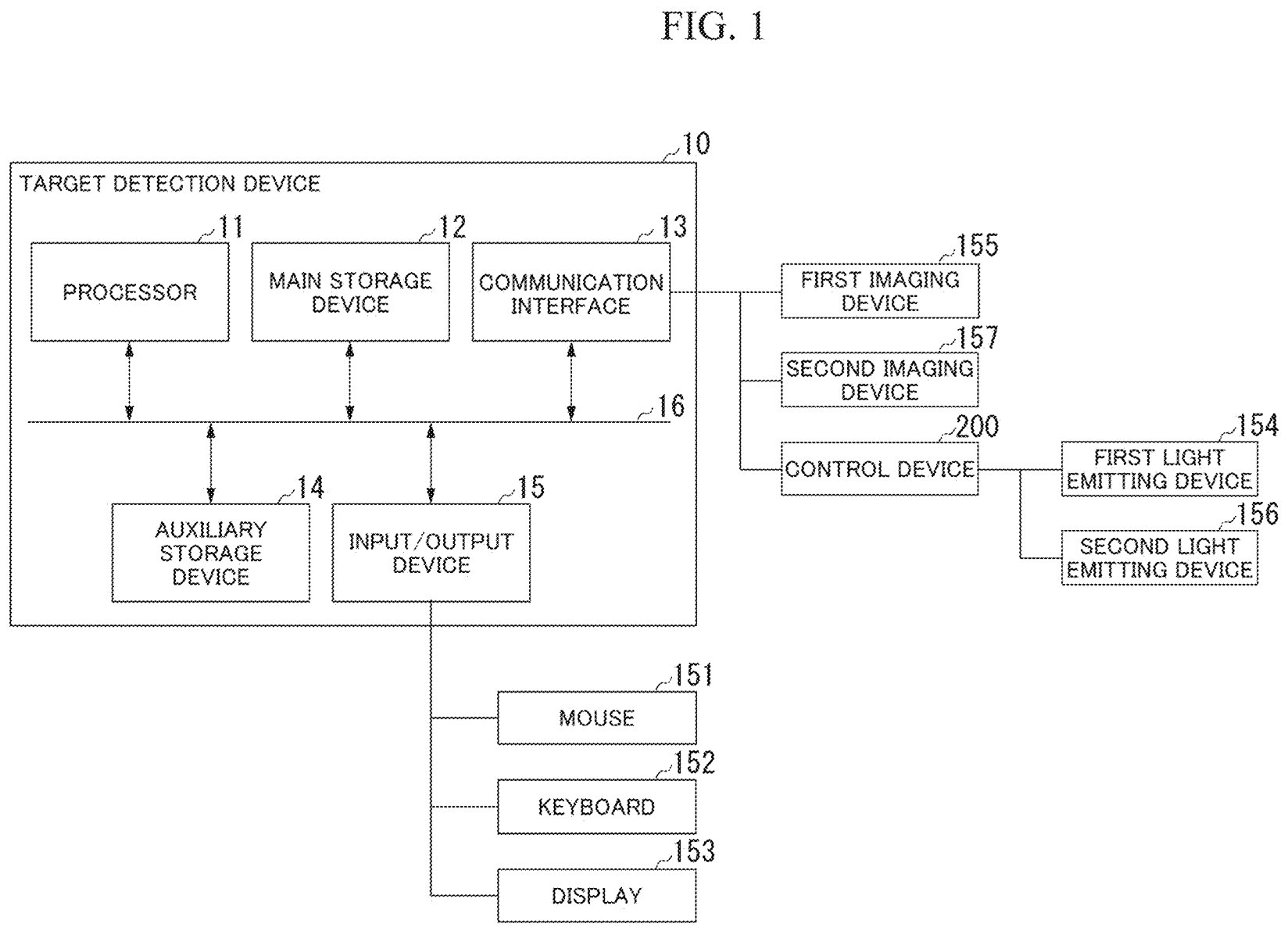

FIG. 1 is a diagram illustrating an example of a hardware configuration of the target detection device according to the first embodiment. As illustrated in FIG. 1, the target detection device 10 includes a processor 11, a main storage device 12, a communication interface 13, an auxiliary storage device 14, an input/output device 15 and a bus 16.

The processor 11 is, for example, a central processing unit (CPU), which implements each function of the target detection device 10 by reading and executing a target detection program. The processor 11 may also implement functions required for implementing the functions of the target detection device 10 by reading and executing programs other than the target detection program.

The main storage device 12 is, for example, a random-access memory (RAM) and stores in advance the target detection program and other programs that are read and executed by the processor 11.

The communication interface 13 is an interface circuit that executes communications with a first imaging device 155, a second imaging device 157, a control device 200, and other devices via a network. The network mentioned herein is, for example, a wide area network (WAN), a local area network (LAN), the Internet or an intranet.

The auxiliary storage device 14 is, for example, a hard disk drive (HDD), a solid-state drive (SSD), a flash memory or a read only memory (ROM).

The input/output device 15 is, for example, an input/output port. The input/output device 15 is connected, for example, to a mouse 151, a keyboard 152 and a display 153 illustrated in FIG. 1. FIG. 2 is a diagram illustrating an example of the target detection device, a first light emitting device, a first imaging device, a second light emitting device, a second imaging device and a food processing line according to the first embodiment. The input/output device 15 is connected, for example, to the first imaging device 155, the second imaging device 157 and the control device 200 illustrated in FIGS. 1 and 2. The control device 200 is connected to a first light emitting device 154 and a second light emitting device 156, and controls the first light emitting device 154 and the second light emitting device 156.

The mouse 151 and the keyboard 152 are used, for example, for an operation of inputting data required for operating the target detection device 10.

The display 153 is, for example, a liquid crystal display. The display 153 displays, for example, a graphical user interface (GUI) of the target detection device 10. The display 153 also displays, for example, at least one of the images illustrated in FIG. 4, FIG. 5, FIG. 7, FIG. 8, FIG. 10, FIG. 11, FIG. 12, FIG. 13, FIG. 14, FIG. 15 and FIG. 16.

The first light emitting device 154 is a device that irradiates a subject with light belonging to a first wavelength group, and includes, for example, a light emitting diode (LED), a halogen lamp, a tungsten lamp, or a laser. The subject is, for example, a chicken thigh M illustrated in FIG. 2. The chicken thigh M is conveyed by a belt conveyor 201 constituting a food processing line 20 and is sequentially detected by a photoelectric sensor 202 and a photoelectric sensor 203. The belt conveyor 201, the photoelectric sensor 202 and the photoelectric sensor 203 are controlled by the control device 200. The first light emitting device 154 is installed, for example, at a position where the chicken thigh M conveyed by the belt conveyor 201 can be irradiated with light from above as illustrated in FIG. 2.

The first wavelength group described above includes at least one wavelength belonging to a predetermined wavelength range. For example, the first wavelength group includes a wavelength of 365 nm or a wavelength of 340 nm. A wavelength of 460 nm is an example of a first main wavelength that will be described later. On the other hand, a wavelength of 520 nm is an example of a first subordinate wavelength that will be described later.

Figure 3:
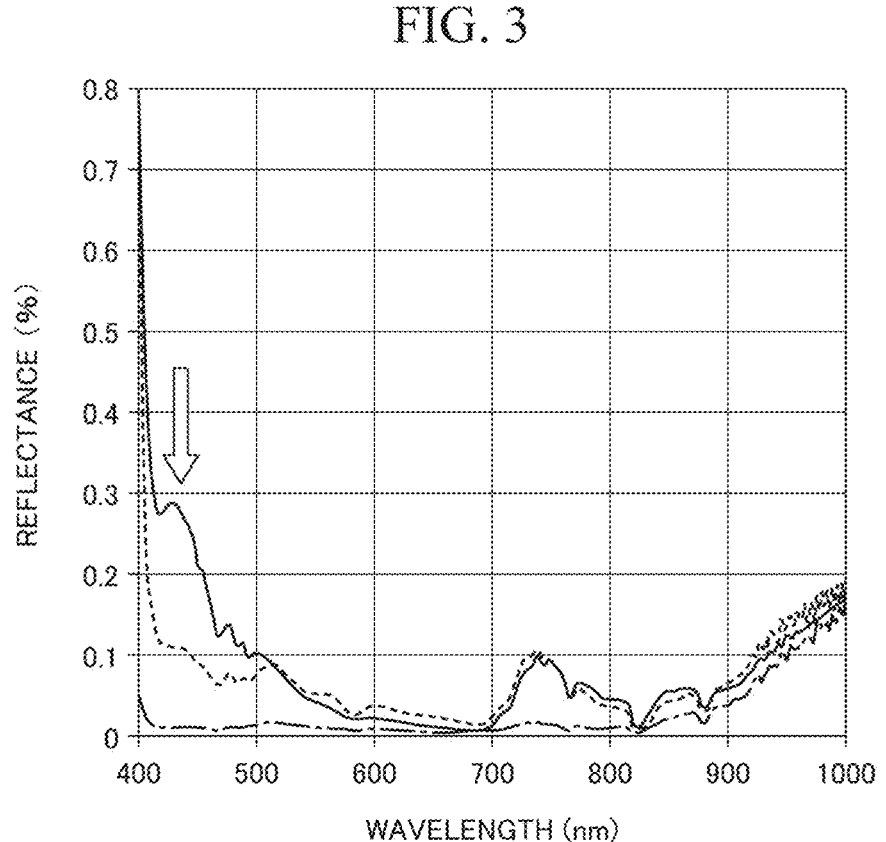
FIG. 3 is a diagram illustrating an example of a reflection spectrum in a visible light range of cartilage, a reflection spectrum in the visible light range of fat, and a reflection spectrum in the visible light range of lean meat in a chicken thigh according to the first embodiment.

FIG. 3 is a diagram illustrating an example of a reflection spectrum in a visible light range of cartilage, a reflection spectrum in the visible light range of fat, and a reflection spectrum in the visible light range of lean meat of a chicken thigh according to the first embodiment. A solid line in FIG. 3 indicates the reflection spectrum in the visible light range of cartilage of the chicken thigh M. A dotted line in FIG. 3 indicates the reflection spectrum in the visible light range of fat of the chicken thigh M. A one-dot chain line in FIG. 3 indicates the reflection spectrum of lean meat of the chicken thigh M. As indicated by an arrow in FIG. 3, the wavelength of 460 nm is a wavelength giving a peak of the reflection spectrum of cartilage. Light having the wavelength of 460 nm is an example of light having a wavelength whose reflectance is higher than a predetermined first reflectance when the light is applied to cartilage that is an example of a first element and constitutes a knee cartilage part.

The first light emitting device 154 irradiates the chicken thigh M with light having a center wavelength of 365 nm, a shortest wavelength of 355 nm, and a longest wavelength 375 nm at a timing after the chicken thigh M has been detected by the photoelectric sensor 202 and before the chicken thigh M is detected by the photoelectric sensor 203. Alternatively, the first light emitting device 154 irradiates the chicken thigh M with light having a center wavelength of 340 nm, a shortest wavelength of 330 nm, and a longest wavelength 350 nm at a timing after the chicken thigh M has been detected by the photoelectric sensor 202 and before the chicken thigh M is detected by the photoelectric sensor 203. These lights excite fluorescence having a wavelength of 460 nm and a wavelength of 520 nm on the surface of the chicken thigh M, and belong to the first wavelength group.

The first imaging device 155 is a camera equipped with a light receiving element that can detect light emitted from the chicken thigh M. The light emitted from the chicken thigh M mentioned herein is fluorescence having a wavelength of 460 nm M and fluorescence having a wavelength of 520 nm that are emitted from the chicken thigh M itself. The wavelength of 460 nm is an example of a first main wavelength. On the other hand, the wavelength of 520 nm is an example of a first subordinate wavelength. The light emitted from the chicken thigh M may be light reflected on the surface of the chicken thigh M. For example, when the light emitted from the chicken thigh M is light belonging to the visible light range, the first imaging device 155 is equipped with a light receiving element utilizing silicon (Si), gallium phosphide (GaP), or gallium arsenide phosphide (GaAsP) as a semiconductor. The first imaging device 155 is installed in such a manner that the chicken thigh M located between the photoelectric sensor 202 and the photoelectric sensor 203 can be captured from above as illustrated in FIG. 2, for example.

Figure 4:
FIG. 4 is a diagram illustrating an example of a first main image that is captured by detecting light having a first main wavelength emitted from a chicken thigh according to the first embodiment.

The first imaging device 155 generates a first main image by imaging a subject irradiated with light from the first light emitting device 154. FIG. 4 is a diagram illustrating an example of a first main image that is captured by detecting light having a first main wavelength emitted from a chicken thigh according to the first embodiment. For example, the first imaging device 155 generates the first main image illustrated in FIG. 4 by detecting fluorescence having a wavelength of 460 nm from a chicken thigh M when the chicken thigh M is irradiated with light by the first light emitting device 154, and fluorescence having a wavelength of 460 nm and fluorescence having a wavelength of 520 nm are emitted from the chicken thigh M. The first main image illustrated in FIG. 4 depicts the chicken thigh M and visualizes a knee cartilage part included in the chicken thigh M in a region indicated by a circle C4.

Figure 5:
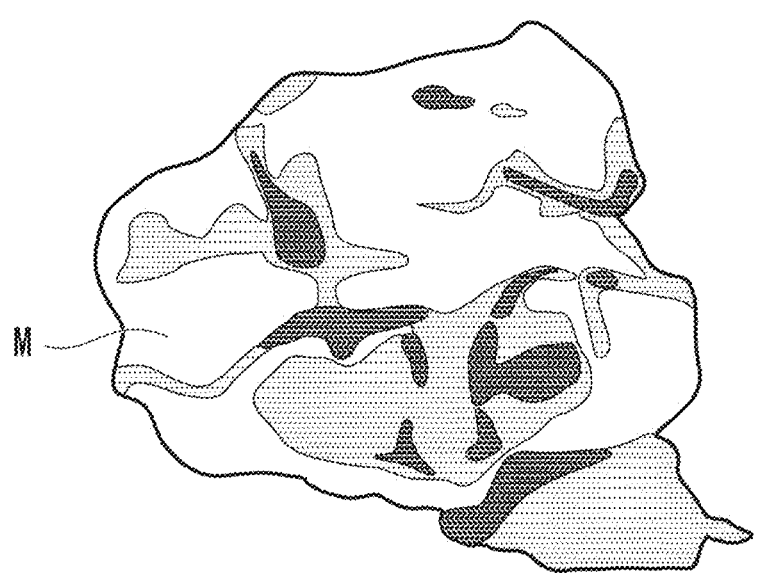
FIG. 5 is a diagram illustrating an example of a first subordinate image that is captured by detecting light having a first subordinate wavelength emitted from a chicken thigh according to the first embodiment.

The first imaging device 155 generates a first subordinate image by imaging a subject irradiated with light from the first light emitting device 154. FIG. 5 is a diagram illustrating an example of a first subordinate image that is captured by detecting light having a first subordinate wavelength emitted from a chicken thigh according to the first embodiment. For example, the first imaging device 155 generates the first subordinate image illustrated in FIG. 5 by detecting fluorescence having a wavelength of 520 nm from a chicken thigh M when the chicken thigh M is irradiated with light by the first light emitting device 154 and fluorescence having a wavelength of 460 nm and fluorescence having a wavelength of 520 nm are emitted from the chicken thigh M. The first subordinate image illustrated in FIG. 5 depicts the chicken thigh M.

The second light emitting device 156 is a device that irradiates a subject with light belonging to a second wavelength group other than the first wavelength group and having a different wavelength from the light with which the subject is irradiated to capture the first image, and includes, for example, an LED, a halogen lamp, a tungsten lamp, or a laser. The second light emitting device 156 is installed, for example, at a position where the chicken thigh M conveyed by the belt conveyor 201 can be irradiated with light from above as illustrated in FIG. 2.

The second wavelength group described above includes at least one wavelength belonging to a predetermined wavelength range. For example, the second wavelength group includes a wavelength of 1211 nm and a wavelength of 1287 nm belonging to a near-infrared light range of wavelengths from 700 nm to 2500 nm. The wavelength of 1211 nm is an example of a second subordinate wavelength that will be described later. On the other hand, the wavelength of 1287 nm is an example of a second main wavelength that will be described later. Some of the wavelengths included in the second wavelength group may be included in the first wavelength group.

Figure 6:
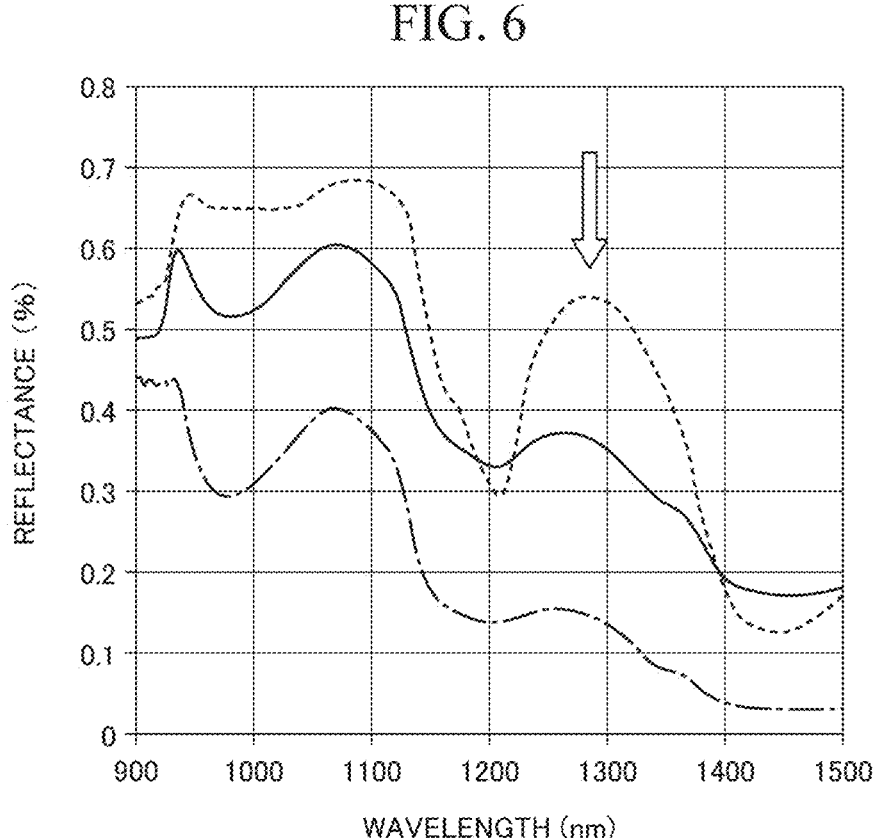
FIG. 6 is a diagram illustrating an example of a reflection spectrum in a near-infrared light range of cartilage, a reflection spectrum in the near-infrared light range of fat, and a reflection spectrum in the near-infrared light range of lean meat in a chicken thigh according to the first embodiment.

FIG. 6 is a diagram illustrating an example of a reflection spectrum in a near-infrared light range of cartilage, a reflection spectrum in the near-infrared light range of fat, and a reflection spectrum in the near-infrared light range of lean meat of a chicken thigh according to the first embodiment. A solid line in FIG. 6 indicates the reflection spectrum in the near-infrared light range of cartilage of the chicken thigh M.

A dotted line in FIG. 6 indicates the reflection spectrum in the near-infrared light range of fat of the chicken thigh M. A one-dot chain line in FIG. 6 indicates the reflection spectrum of lean meat of the chicken thigh M. As indicated by an arrow in FIG. 6, the wavelength of 1287 nm described above is a wavelength giving a peak of the reflection spectrum of cartilage. Light having the wavelength of 1287 nm is an example of light having a wavelength at which the reflectance is higher than a predetermined second reflectance when the light is applied to a fat that is an example of a second element and constitutes a knee cartilage part.

The second light emitting device 156 irradiates the chicken thigh M with light having a wavelength of 1287 nm and a wavelength of 1211 nm at a timing after the chicken thigh M has been detected by the photoelectric sensor 203.

The second imaging device 157 is a camera equipped with a light receiving element that can detect light emitted from the chicken thigh M. The light emitted from the chicken thigh M mentioned herein is light having a wavelength of 1211 nm and a wavelength of 1287 nm reflected by the surface of the chicken thigh M. The wavelength of 1211 nm is an example of a second subordinate wavelength. On the other hand, the wavelength of 1287 nm is an example of a second main wavelength. The light emitted from the chicken thigh M may be light emitted from the chicken thigh M itself. For example, when the light emitted from the chicken thigh M is light belonging to a near-infrared light range, the second imaging device 157 is equipped with a light receiving element utilizing indium gallium arsenide (InGaAs), lead sulfide (PbS), or lead selenide (PbSe) as a semiconductor. The second imaging device 157 is installed in such a manner that a chicken thigh M located downstream of the photoelectric sensor 203 on the belt conveyor 201 can be imaged from above as illustrated in FIG. 2, for example.

Figure 7:
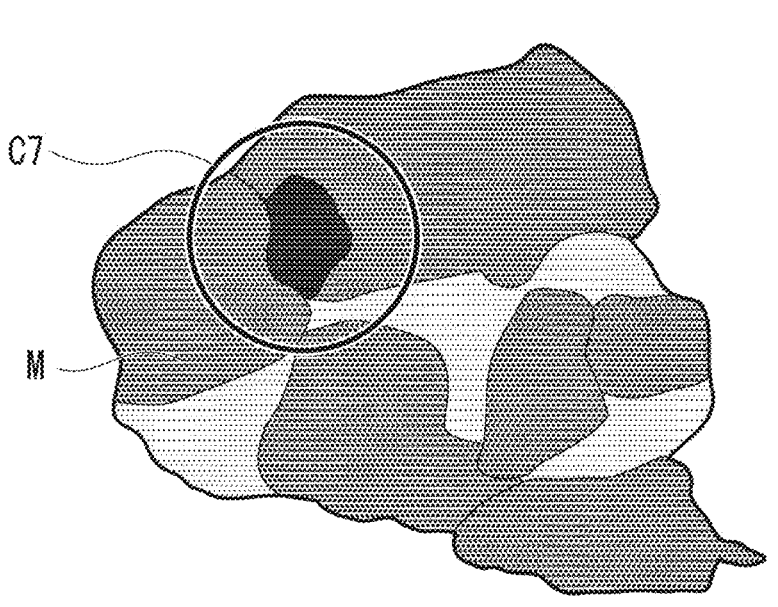
FIG. 7 is a diagram illustrating an example of a second main image that is captured by irradiating a chicken thigh with light having a second main wavelength according to the first embodiment.

The second imaging device 157 generates a second subordinate image by imaging the subject irradiated with light from the second light emitting device 156. FIG. 7 is a diagram illustrating an example of the second main image that is captured by irradiating a chicken thigh with light having the second main wavelength according to the first embodiment. For example, the second imaging device 157 generates the second main image illustrated in FIG. 7 by imaging the chicken thigh M when light having the wavelength 1211 nm and the wavelength 1287 nm is applied to the chicken thigh M and the light is reflected on the surface of the chicken thigh M. The second main image illustrated in FIG. 7 depicts the chicken thigh M, and a knee cartilage part included in the chicken thigh M is visualized in a region indicated by a circle C7.

Figure 8:
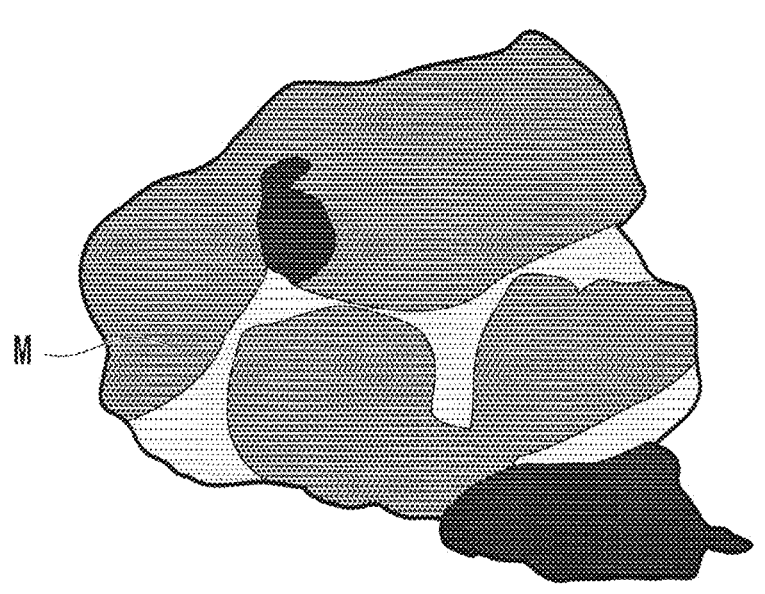
FIG. 8 is a diagram illustrating an example of a second subordinate image that is captured by irradiating the chicken thigh with light having a second subordinate wavelength according to the first embodiment.

The second imaging device 157 generates a second subordinate image by imaging the subject irradiated with light from the second light emitting device 156. FIG. 8 is a diagram illustrating an example of the second subordinate image that is captured by irradiating a chicken thigh with light having the second subordinate wavelength according to the first embodiment. For example, the second imaging device 157 generates the second subordinate image illustrated in FIG. 8 by imaging the chicken thigh M when light having the wavelength 1211 nm and 1287 nm is applied to the chicken thigh M and the light is reflected on the surface of the chicken thigh M. The second subordinate image illustrated in FIG. 8 depicts the chicken thigh M.

The bus 16 connects the processor 11, the main storage device 12, the communication interface 13, the auxiliary storage device 14, and the input/output device so that they can transmit and receive data each other.

Next, processes that are performed by the target detection device according to the first embodiment will be described with reference to FIGS. 9 to 16. FIG. 9 is a diagram illustrating an example of a functional configuration of the target detection device according to the first embodiment. As illustrated in FIG. 9, the target detection device 10 includes a first image generating unit 101, a first image acquiring unit 102, a second image generating unit 103, a second image acquiring unit 104, and a target detecting unit 105.

The first image generating unit 101 generates a first image using the first main image and the first subordinate image. Specifically, the first image generating unit 101 generates an image, in which each pixel represents a value calculated based on the luminance of each pixel included in the first main image and the luminance of each pixel included in the first subordinate image, as the first image.

Figure 10:
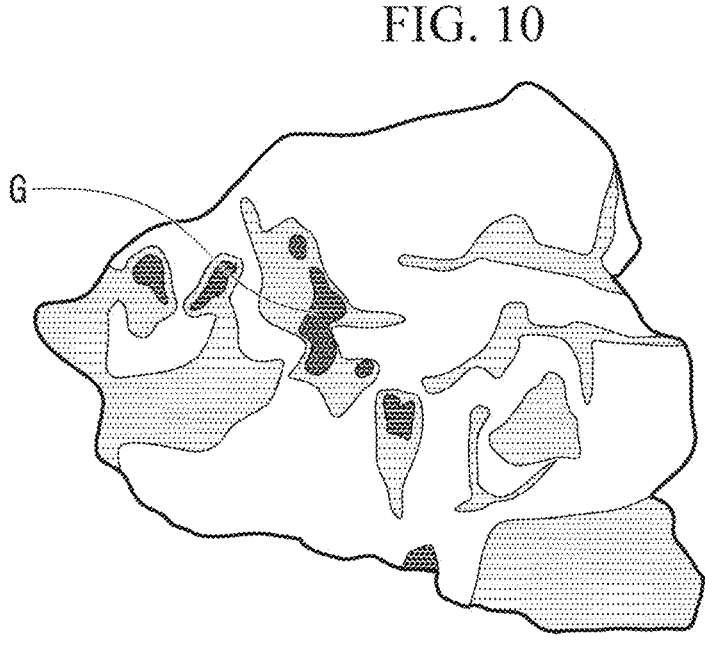
FIG. 10 is a diagram illustrating an example of a first image that is generated using the first main image illustrated in FIG. 4 and the first subordinate image illustrated in FIG. 5.

FIG. 10 is a diagram illustrating an example of the first image that is generated using the first main image illustrated in FIG. 4 and the first subordinate image illustrated in FIG. 5. For example, the first image generating unit 101 performs a process of calculating a ratio of luminances represented by each of two pixels located at the same coordinates in the first main image illustrated in FIG. 4 and the first subordinate image illustrated in FIG. 5 for all the coordinates and generates the first image illustrated in FIG. 10. Since each pixel therein represents the value obtained by dividing the luminance of each pixel in the first main image by the luminance of each pixel in the first subordinate image, the first image illustrated in FIG. 10 is an image in which an effect of a variation in light exposure due to the uneven surface of the chicken thigh M is reduced.

The first image acquiring unit 102 acquires a first image depicting a subject, which is generated by irradiating the subject with light belonging to the first wavelength group. The first image acquiring unit 102 acquires, for example, the first image illustrated in FIG. 10.

The second image generating unit 103 generates a second image using the second main image and the second subordinate image. Specifically, the second image generating unit 103 generates an image in which each pixel represents a value calculated based on the luminance of each pixel included in the second main image and the luminance of each pixel included in the second subordinate image.

Figure 11:
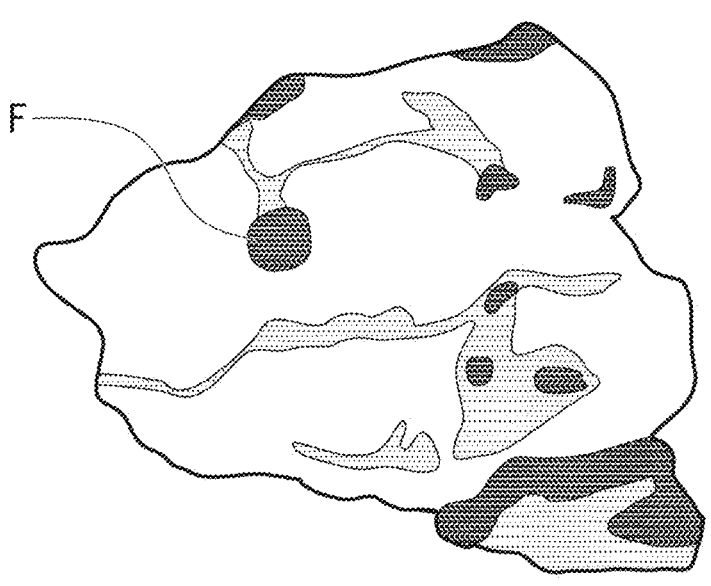
FIG. 11 is a diagram illustrating an example of a second image that is generated using the second main image illustrated in FIG. 7 and the second subordinate image illustrated in FIG. 8.

FIG. 11 is a diagram illustrating an example of the second image that is generated using the second main image illustrated in FIG. 7 and the second subordinate image illustrated in FIG. 8. For example, the second image generating unit 103 performs a process of calculating a difference between luminances represented by each of two pixels located at the same coordinates in the second main image illustrated in FIG. 7 and the second subordinate image illustrated in FIG. 8 for all the coordinates, and generates the second image illustrated in FIG. 11. Since each pixel therein represents the value obtained by subtracting the luminance of each pixel in the second subordinate image from the luminance of each pixel in the second main image, the second image illustrated in FIG. 11 is an image in which an effect of noise is reduced.

The second image acquiring unit 104 acquires the second image depicting the subject, which is generated by irradiating the subject with light having a wavelength belonging to the second wavelength group different from the first wavelength group with which the subject has been irradiated to generate the first image. The second image acquiring unit 104 acquires, for example, the second image illustrated in FIG. 11.

The target detecting unit 105 detects a target included in the subject using the first image and the second image.

Specifically, the target detecting unit 105 detects a knee cartilage part included in the chicken thigh M illustrated in FIG. 2 using the first image illustrated in FIG. 10 and the second image illustrated in FIG. 11. The target detecting unit 105 detects the target by detecting a first element that is visualized with a luminance higher than a predetermined first luminance in the first image and detecting a second element that is visualized with a luminance higher than a predetermined second luminance in the second image and that is different from the first element.

Figure 12:
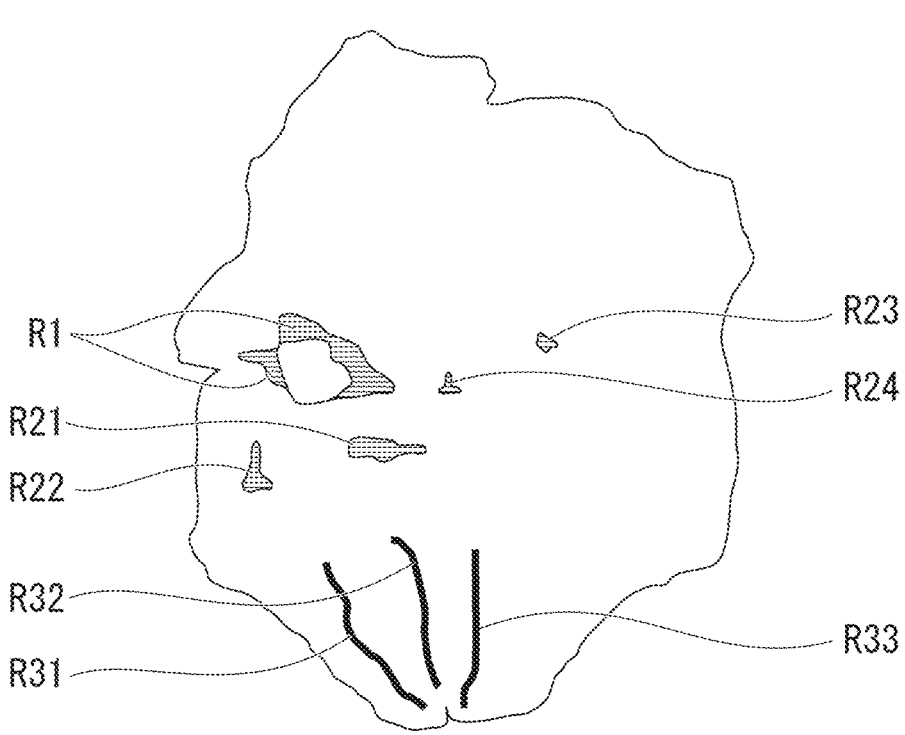
FIG. 12 is a diagram illustrating an example of regions that are visualized with luminance higher than the predetermined first luminance in the first image according to the first embodiment.

FIG. 12 is a diagram illustrating an example of regions that are visualized with luminance higher than the predetermined first luminance in the first image according to the first embodiment. The target detecting unit 105 extracts regions R1, R21, R22, R23, R24, R31, R32, and R33 illustrated in FIG. 12 based on the predetermined first luminance. These regions are regions where cartilage, which constitutes a knee cartilage part included in the chicken thigh M and is an example of the first element described above, is likely to be visualized. It is also likely that objects other than the cartilage, which emits fluorescence with a wavelength similar to that of the cartilage, are visualized in these regions. Alternatively, it is also likely that an object, which has reflectance similar to that of the cartilage, is visualized in these regions.

The target detecting unit 105 excludes regions in which the first element is relatively more likely not to be visualized from the aforementioned regions by using at least one narrowing condition.

The target detecting unit 105 excludes at least one of the regions whose area is less than a predetermined first lower-limit threshold value and the regions whose area is greater than a predetermined first upper-limit threshold value from the regions that are visualized with a luminance higher than the predetermined first luminance in the first image. For example, the target detecting unit 105 excludes the regions R23 and R24 whose area is less than a predetermined first lower-limit threshold value from the regions illustrated in FIG. 12. The area regions R23 and the area R24 are small in area, and thus they are not regions where the first element is visualized, but are regions where noise is more likely to be visualized.

The target detecting unit 105 excludes at least one of the regions where the area of a circumscribed figure is less than the predetermined first lower-limit threshold value and the regions where the area of a circumscribed figure is greater than the predetermined first upper-limit threshold value from the regions that are visualized with luminances higher than the predetermined first luminance in the first image. For example, the target detecting unit 105 excludes the regions R31, R32, and R33 where the area of a circumscribed figure is greater than the predetermined first upper-limit threshold value from the regions illustrated in FIG. 12. The regions R31, R32, and R33 are all elongated regions with a long radius of a circumscribed figure, and thus they are regions where a muscle or a fascia included in the chicken thigh M is more likely to be visualized.

Figure 13:
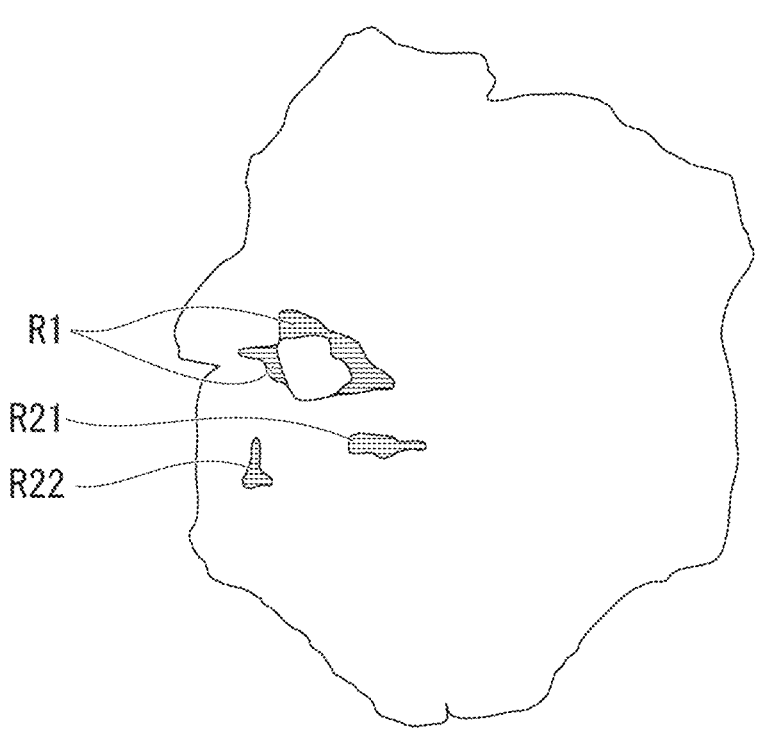
FIG. 13 is a diagram illustrating an example of regions in which a first element is likely to be visualized according to the first embodiment.

FIG. 13 is a diagram illustrating an example of regions where the first element is likely to be visualized according to the first embodiment. The target detecting unit 105 extracts the regions R1, R21, and R22 as regions where cartilage of a knee cartilage part is likely to be visualized as illustrated in FIG. 13 by using the aforementioned narrowing conditions.

Figure 14:
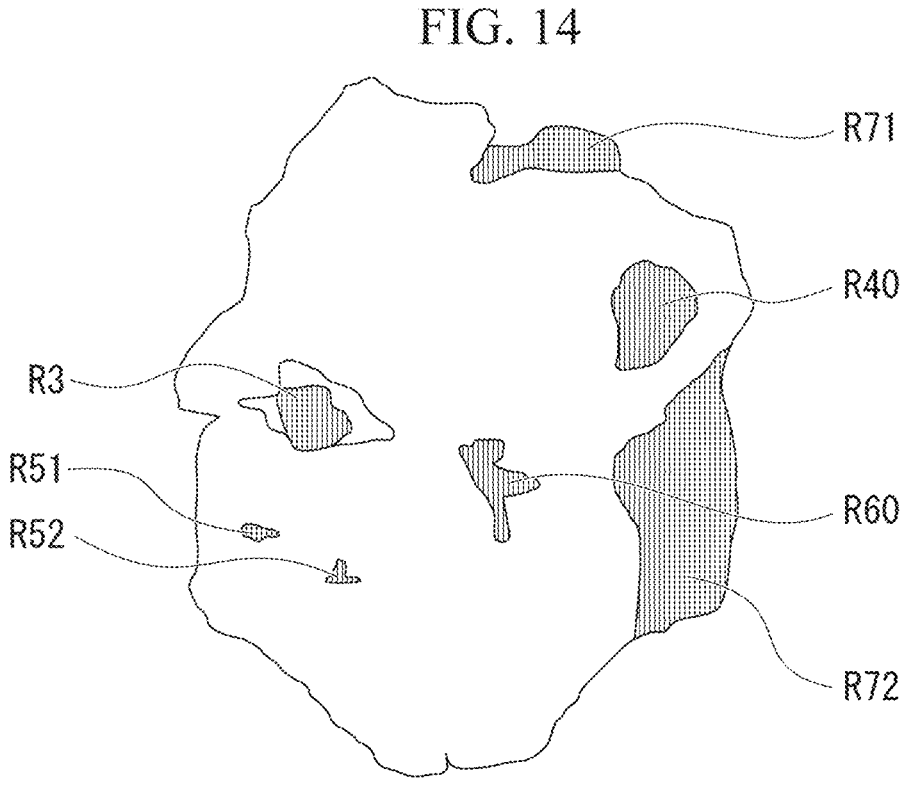
FIG. 14 is a diagram illustrating an example of regions that are visualized with luminance higher than the predetermined second luminance in the second image according to the first embodiment.

FIG. 14 is a diagram illustrating an example of regions that are visualized with a luminance higher than a predetermined second luminance in the second image according to the first embodiment. The target detecting unit 105 extracts regions R3, R40, R51, R52, R60, R71, and R72 illustrated in FIG. 14 based on the predetermined second luminance. These regions are regions where fat, which constitutes a knee cartilage part included in the chicken thigh M and is an example of the second element described above, is likely to be visualized. It is also likely that objects other than the fat, which have reflectance similar to that of the fat, are visualized in these regions. Alternatively, it is also likely that an object, which emits fluorescence with a wavelength similar to that of the fat, is visualized in these regions.

The target detecting unit 105 excludes regions in which the second element is relatively more likely not to be visualized from the aforementioned areas by using at least one narrowing condition.

The target detecting unit 105 excludes at least one of regions whose area is less than the predetermined second lower-limit threshold value and regions whose area is greater than the predetermined second upper-limit threshold value from the regions that are visualized with a luminance higher than the predetermined second luminance in the second image. For example, the target detecting unit 105 excludes the regions R51 and R52 whose area is less than the predetermined second lower-limit threshold value from the regions illustrated in FIG. 14. The regions R51 and R52 are relatively small in area, and thus they are more likely to be regions where noise is visualized rather than regions where the second element is visualized. For example, the target detecting unit 105 excludes the region R72 whose area is greater than the predetermined second upper-limit threshold value from the regions illustrated in FIG. 14. The region R72 is relatively large in area, and thus that is not a region where the second element is visualized, but is a region where a chicken skin included in the chicken thigh M is more likely to be visualized.

The target detecting unit 105 excludes at least one of regions where a value obtained by dividing the length of an outline thereof by the area is less than the predetermined second lower-limit threshold value and regions where a value obtained by dividing the length of an outline thereof by the area is greater than the predetermined second upper-limit threshold value from the regions that are visualized with luminances higher than the predetermined second luminance in the second image. For example, the target detecting unit 105 excludes the region R60 where the value obtained by dividing the length of the outline by the area thereof is greater than the predetermined first upper-limit threshold value from the regions illustrated in FIG. 14. The region R60 is not a region where the second element is visualized, but is a region where fat, not constituting the knee cartilage part, is more likely to be visualized.

The target detecting unit 105 excludes regions whose distance from the outline of the subject is less than a predetermined threshold value from the regions that are visualized with a luminance higher than the predetermined second luminance in the second image. For example, the target detecting unit 105 excludes the regions R71 and R72 whose distance from the outline of the subject is less than the predetermined threshold value from the regions illustrated in FIG. 14. The regions R71 and R72 are located at positions relatively close to the outline of the chicken thigh M, and thus they are not regions where the second element is visualized but are regions where a chicken skin included in the chicken thigh M is more likely to be visualized.

Figure 15:
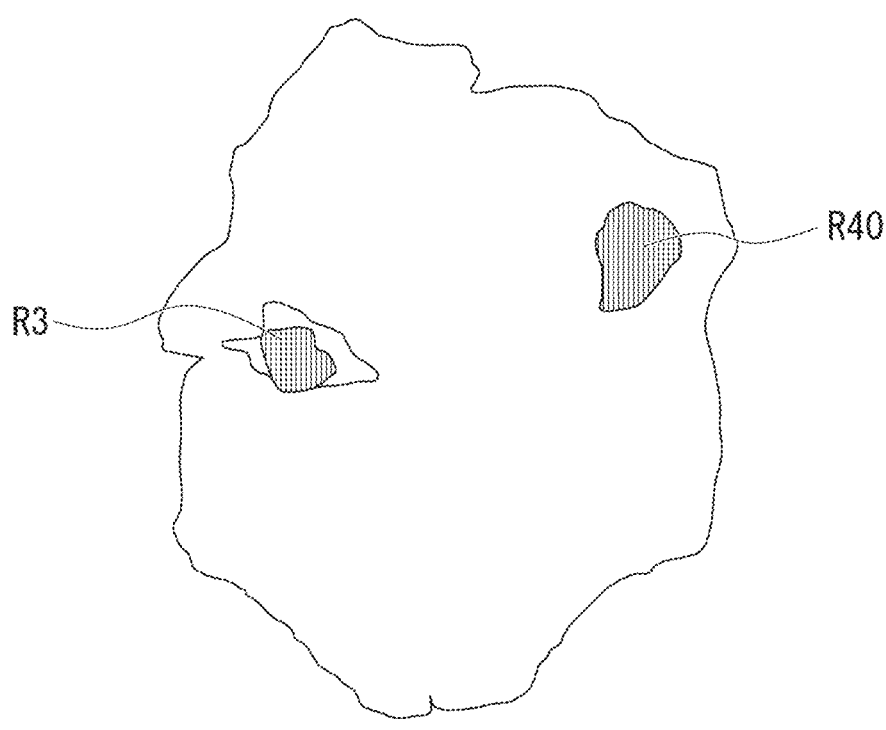
FIG. 15 is a diagram illustrating an example of regions in which a second element is likely to be visualized according to the first embodiment.

FIG. 15 is a diagram illustrating an example of regions where the second element is likely to be visualized according to the first embodiment. The target detecting unit 105 extracts the regions R3 and R40 as regions where cartilage of a knee cartilage part is likely to be visualized as illustrated in FIG. 15 by using the aforementioned narrowing conditions.

Figure 16:
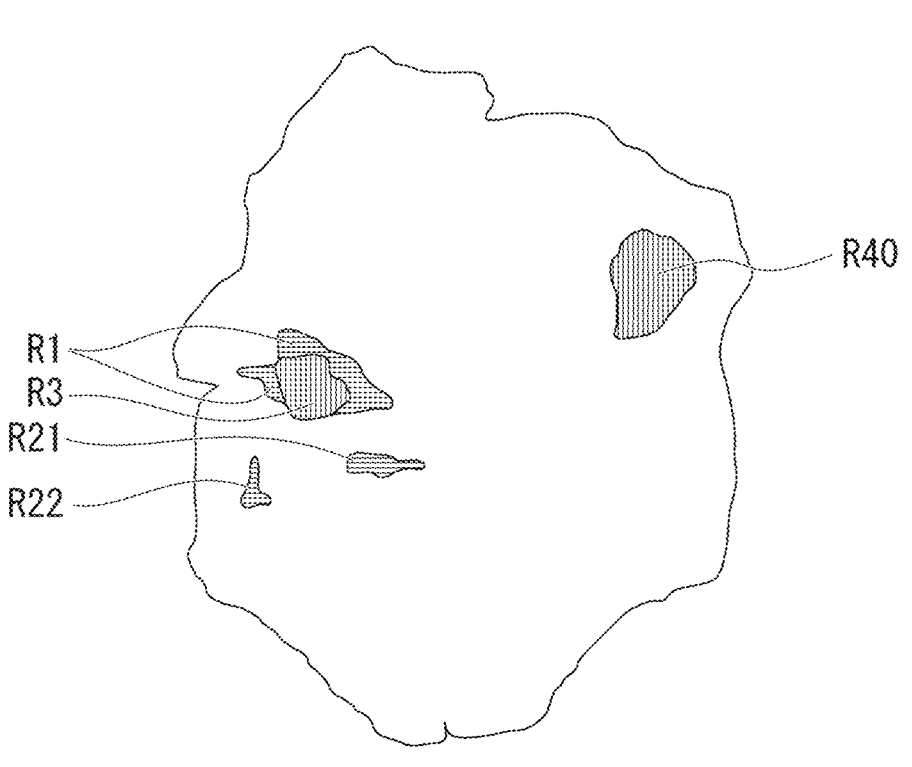
FIG. 16 is a diagram illustrating an example of a multi-channel image according to the first embodiment.

Then, the target detecting unit 105 generates a multi-channel image using the first image and the second image. FIG. 16 is a diagram illustrating an example of the multi-channel image according to the first embodiment. For example, the target detecting unit 105 performs a composite process to combine the first image illustrated in FIG. 13 and the second image illustrated in FIG. 15 and generates the multi-channel image illustrated in FIG. 16. In the multi-channel image illustrated in FIG. 16, the regions R1, R21, and R22 illustrated in FIG. 13 and the regions R3 and R40 illustrated in FIG. 15 are visualized. The composite process includes at least one of an enlargement process, a reduction process, a resolution matching process, a distortion removing process, and an alignment process.

The enlargement process is a process of enlarging at least one of the first image and the second image in at least one direction in order to match the dimensions of the subject visualized in the first image with the dimensions of the subject visualized in the second image. The reduction process is a process of reducing at least one of the first image and the second image in at least one direction in order to match the dimensions of the subject visualized in the first image with the dimensions of the subject visualized in the second image.

The resolution matching process is a process of adjusting at least one of a resolution of the first image and a resolution of the second image to match the resolution of the first image with the resolution of the second image. The distortion removing process includes at least one of the following processes: removing distortion in the first image due to distortion in an optical component such as a lens used to capture the first image and a process of removing distortion in the second image due to distortion in an optical component such as a lens used to capture the second image. The alignment process is a process of adjusting at least one of the first image and the second image so that a reference point set at a specific part of the subject depicted in the first image and a reference point set at a specific part of the subject depicted in the second image match each other.

Then, the target detecting unit 105 selects a first point in each of regions where the first element is visualized in the first image based on a predetermined first rule. For example, the target detecting unit 105 calculates positions of the centers of gravity in each of the regions R1, R21, and R22 illustrated in FIG. 16, and selects these centers of gravity as the first point. The target detecting unit 105 also selects a second point in each of regions where the second element is visualized in the second image based on a predetermined second rule. For example, the target detecting unit 105 calculates positions of the centers of gravity in each of the regions R3 and R40 illustrated in FIG. 16, and selects these centers of gravity as the second point.

Then, the target detecting unit 105 detects a combination of the first element and the second element that determines the first point and the second point so that the length of a line segment connecting the first point and the second point is less than a predetermined length, as a target.

For example, in the example illustrated in FIG. 16, only the length of the line segment connecting the center of gravity in the region R1 and the center of gravity in the region R3 is less than the predetermined length described above. Therefore, in the example illustrated in FIG. 16, the first element is visualized in the region R1 and the second element is visualized in the region R3, and the target detecting unit 105 detects a combination of the first element and the second element as a knee cartilage part included in the chicken thigh M.

Figure 17:
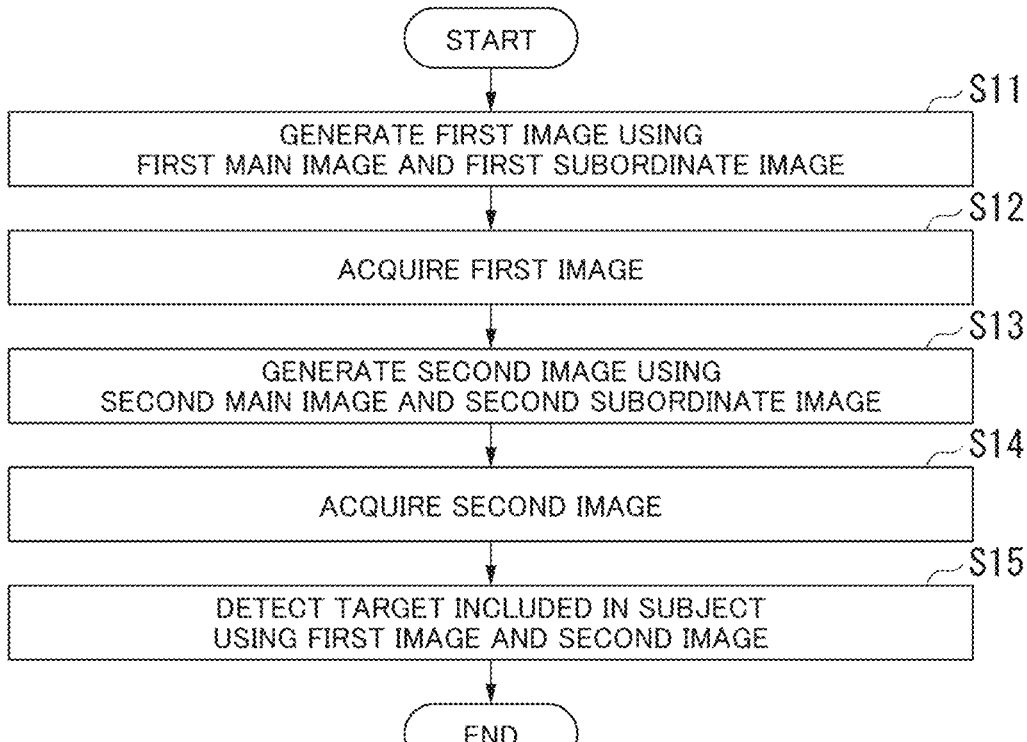
FIG. 17 is a flowchart illustrating an example of a process that is performed by the target detection device according to the first embodiment.

Next, an example of a routine that is performed by the target detection device according to the first embodiment will be described with reference to FIG. 17. FIG. 17 is a flowchart illustrating an example of the routine that is performed by the target detection device according to the first embodiment.

In Step S11, the first image generating unit 101 generates a first image using a first main image and a first subordinate image.

In Step S12, the first image acquiring unit 102 acquires the first image.

In Step S13, the second image generating unit 103 generates a second image using a second main image and a second subordinate image.

In Step S14, the second image acquiring unit 104 acquires the second image.

In Step S15, the object detecting unit 105 detects a target included in a subject using the first image and the second image.

The target detection device and the target detection program according to the first embodiment have been described hitherto. The target detection device 10 has the first image acquiring unit 102, the second image acquiring unit 104, and the target detecting unit 105. The first image acquiring unit 102 acquires a first image depicting a subject, which is generated by irradiating the subject with light belonging to a first wavelength group. The second image acquiring unit 104 acquires a second image depicting the subject, which is generated by irradiating the subject with light belonging to a second wavelength group other than the first wavelength group and having a different wavelength from the light with which the subject has been irradiated to generate the first image. The target detecting unit 105 detects a target included in the subject using the first image and the second image.

That is, the target detection device 10 detects a target included in a subject using multiple lights having different wavelengths from each other. Accordingly, the target detection device 10 can accurately detect a target included in a subject even when the target included in the subject is composed of multiple elements and the reflection spectrum of each element is different.

The target detection device 10 detects a target by detecting a first element that is visualized with a luminance higher than a predetermined first luminance in the first image and detecting a second element that is visualized with a luminance higher than a predetermined second luminance in the second image and, which is different from the first element.

Accordingly, when a first element and a second element are included in a target, the target detection device 10 can further accurately detect the target. The first element mentioned herein may be an element that emits light having a wavelength belonging to the first wavelength group and having an intensity above a certain level or may be an element that has a relatively high reflectance of light having a wavelength belonging to the first wavelength group. The second element mentioned herein may be an element that emits light having a wavelength belonging to the second wavelength group and having an intensity above a certain level or may be an element that has a relatively high reflectance of light having a wavelength belonging to the second wavelength group.

The target detection device 10 also acquires the first image that is generated by irradiating the subject with light having a wavelength whose reflectance when irradiated to the first element exceeds a predetermined first reflectance. Accordingly, the target detection device 10 can detect a target including the first element and the second element using the first image where the first element included in the target is even more clearly visualized.

The target detection device 10 also acquires the second image that is generated by irradiating the subject with light having a wavelength whose reflectance when irradiated to the second element exceeds a predetermined second reflectance. Accordingly, the target detection device 10 can detect a target including the first element and the second element using the second image where the second element included in the target is even more clearly visualized.

The target detection device 10 selects a first point based on the predetermined first rule in each of the regions where the first element is visualized in the first image. Similarly, the target detection device 10 selects a second point based on the predetermined second rule in each of the regions where the second element is visualized in the second image. Then, the target detection device 10 detects a combination of the first element and the second element that determines the first point and the second point so that the length of a line segment connecting the first point and the second point is less than a predetermined distance, as a target.

Accordingly, even when there are one or more of at least one of a region where the first element is likely to be visualized and a region where the second element is likely to be visualized, the target detection device 10 can more reliably detect the target when the first element and the second element are known to be included in the target.

The target detection device 10 acquires the first image in which each pixel represents a value calculated based on the luminance of each pixel included in the first main image and the luminance of each pixel included in the first subordinate image. Accordingly, the target detection device 10 can detect the target included in the subject using the first image in which the first element included in the target is more clearly visualized.

The target detection device 10 acquires the second image in which each pixel represents a value calculated based on the luminance of each pixel included in the second main image and the luminance of each pixel included in the second subordinate image. Accordingly, the target detection device 10 can detect the target included in the subject using the second image in which the second element included in the target is more clearly visualized.

In the first embodiment, an example in which the target detecting unit 105 excludes at least one of regions where the area of a circumscribed figure is less than the predetermined first lower-limit threshold value and regions where the area of a circumscribed figure is greater than the predetermined first upper-limit threshold value from the regions that are visualized with a luminance higher than the predetermined first luminance in the first image has been described, but the present invention is not limited thereto. The target detecting unit 105 may exclude at least one of regions where the area of the circumscribed figure is less than a predetermined second lower-limit threshold value and regions where the area of the circumscribed figure is greater than a predetermined second upper-limit threshold value from the regions that are visualized with a luminance higher than a predetermined second luminance in the second image.

In the first embodiment, an example in which the target detecting unit 105 excludes at least one of regions where a value obtained by dividing the length of the outline by the area thereof is less than the predetermined second lower-limit threshold value and regions where a value obtained by dividing the length of the outline by the area thereof is greater than the predetermined second upper-limit threshold value from the areas that are visualized with a luminance higher than the predetermined second luminance in the second image has been described, but the present invention is not limited thereto. The target detecting unit 105 may exclude at least one of regions where a value obtained by dividing the length of the outline by the area thereof is less than the predetermined first lower-limit threshold value and regions where a value obtained by dividing the length of the outline by the area thereof is greater than the predetermined first upper-limit threshold value from the regions that are visualized with a luminance higher than the predetermined first luminance in the first image.

In the first embodiment, an example in which the target detecting unit 105 excludes regions whose distance from the outline of the subject is less than a predetermined threshold value from the regions that are visualized with a luminance higher than the predetermined second luminance in the second image has been described, but the present invention is not limited thereto. The target detecting unit 105 may exclude regions whose distance from the outline of the subject is less than a predetermined threshold value from the regions that are visualized with a luminance higher than the predetermined first luminance in the first image.

Second Embodiment

A machine learning implementation device, a target detection device, a machine learning implementation program, and a target detection program according to a second embodiment will be described with reference to FIGS. 18 to 21. In description of the second embodiment, the case in which a knee cartilage part included in a chicken thigh is detected will be used as an example. The machine learning implementation device, the target detection device, the machine learning implementation program, and the target detection program according to the second embodiment detect a target included in a subject by using machine learning unlike the target detection device and the target detection program according to the first embodiment. Therefore, in description of the second embodiment, differences from the first embodiment will be mainly described and description of contents that overlap with the first embodiment will be appropriately omitted.

First, hardware constituting the machine learning implementation device according to the second embodiment and hardware attached to the machine learning implementation device will be described with reference to FIG. 18.

Figure 18:
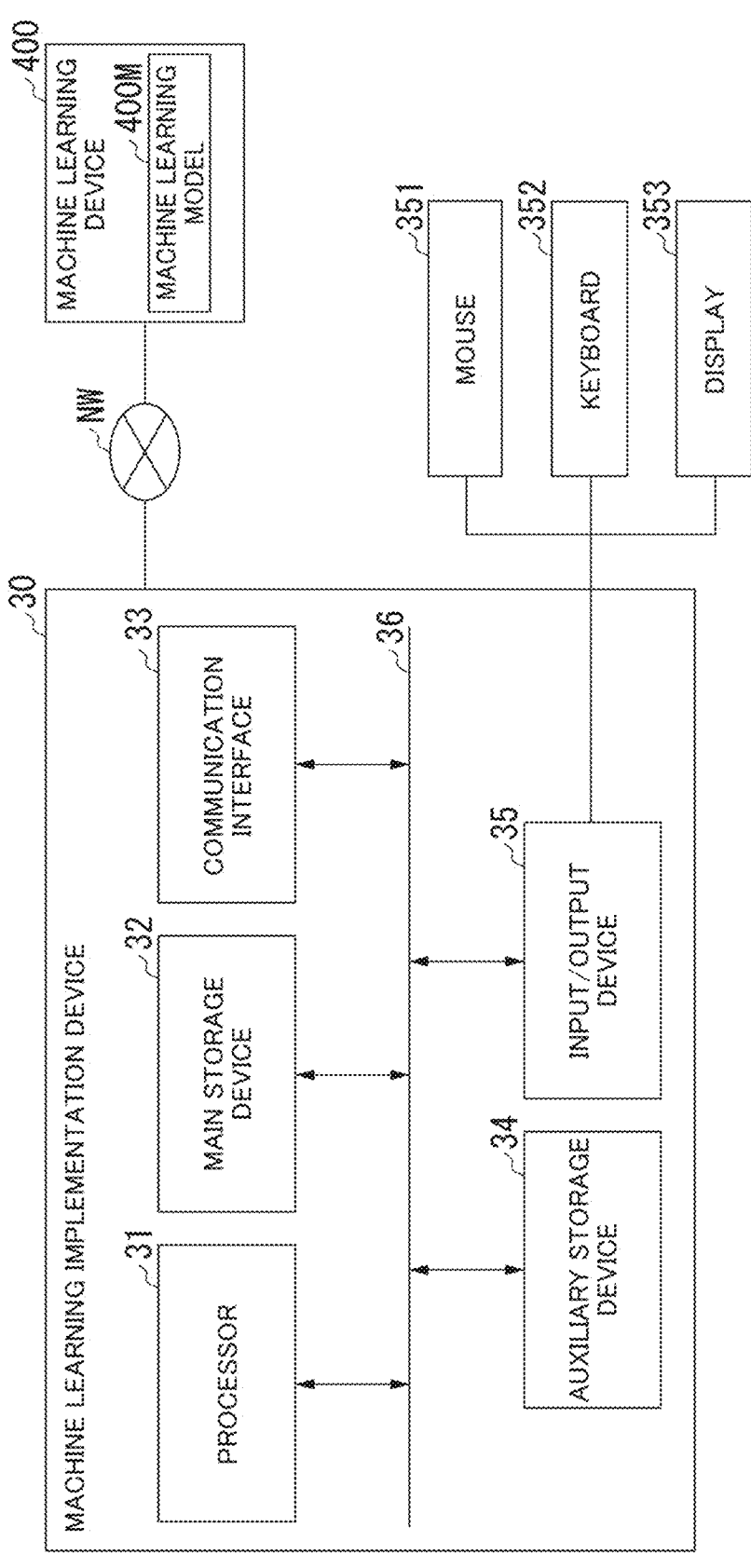
FIG. 18 is a diagram illustrating an example of a hardware configuration of a machine learning implementation device according to a second embodiment.

FIG. 18 is a diagram illustrating an example of a hardware configuration of the machine learning implementation device according to the second embodiment. As illustrated in FIG. 18, the machine learning implementation device 30 has a processor 31, a main storage device 32, a communication interface 33, an auxiliary storage device 34, an input/output device 35, and a bus 36.

The processor 31 is, for example, a CPU and implements each function of the machine learning implementation device 30 by reading and executing a machine learning implementation program. The processor 31 may also implement functions required for implementing each function of the machine learning implementation device 30 by reading and executing programs other than the machine learning implementation program.

The main storage device 32 is, for example, a RAM and stores in advance the machine learning implementation program and other programs that are read and executed by the processor 31.

The communication interface 33 is an interface circuit for executing communication with a machine learning device 400 and other devices via a network NW. The network NW is, for example, a wide area network (WAN), a local area network (LAN), the Internet, or an intranet.

The auxiliary storage device 34 is, for example, a hard disk drive (HDD), a solid-state drive (SSD), a flash memory, or a ROM.

The input/output device 35 is, for example, an input/output port. The input/output device 35 is connected to, for example, a mouse 351, a keyboard 352, and a display 353 illustrated in FIG. 18. The mouse 351 and the keyboard 352 are used, for example, for the task of inputting data required for operating the machine learning implementation device 30. The display 353 is, for example, a liquid crystal display. The display 353 displays, for example, a graphical user interface of the machine learning implementation device 30.

Figures 19, 20:
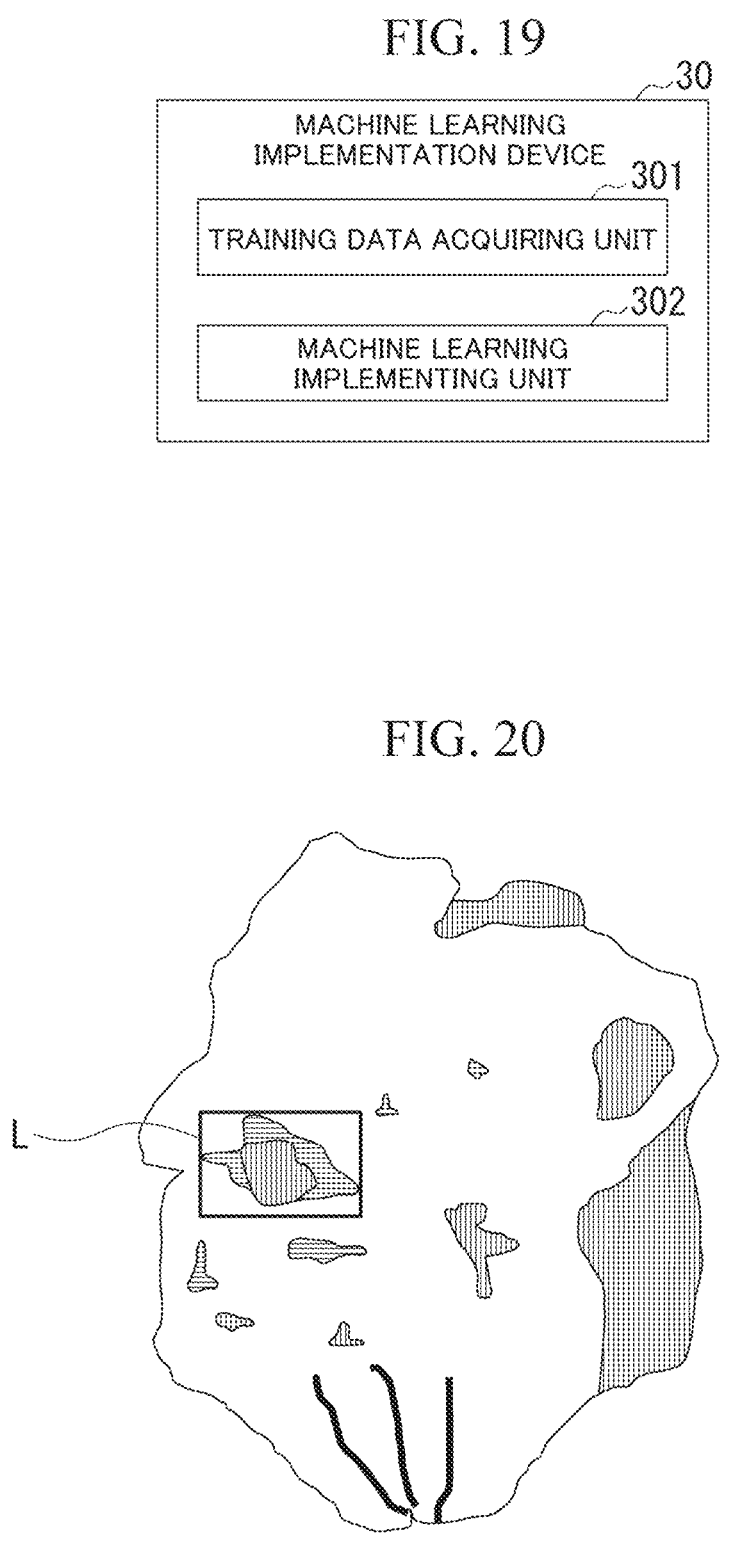

Next, processes performed by the machine learning implementation device according to the second embodiment will be described with reference to FIG. 19 and FIG. 19 is a diagram illustrating an example of a functional configuration of the machine learning implementation device according to the second embodiment. As illustrated in FIG. 19, the machine learning implementation device 30 has a training data acquiring unit 301 and a machine learning implementing unit 302.

The training data acquiring unit 301 acquires training data using, as a question, a training multi-channel image that is generated using a first training image and a second training image, and using, as an answer, the position of a region where a training target included in a training subject depicted in the training multi-channel image is visualized. The training data acquiring unit 301 acquires the training data, for example, via the communication interface 33.

The first training image is an image depicting a training subject, which is generated by irradiating the training subject with light belonging to a first wavelength group. The second training image is an image depicting the training subject, which is generated by irradiating the training subject with light belonging to a second wavelength group. The training subject mentioned herein is, for example, a chicken thigh.

FIG. 20 is a diagram illustrating an example of a training multi-channel image according to the second embodiment. The training multi-channel image is an image generated by applying a composite process on the first training image and the second training image. Regions hatched with horizontal lines in FIG. 20 is the regions where a first element is relatively more likely to be visualized. On the other hand, regions hatched with vertical lines in FIG. 20 are the regions where a second element is relatively more likely to be visualized.

A rectangle L illustrated in FIG. 20 indicates the size and the position of the region where a training target included in the training subject depicted in the training multi-channel image is visualized. The size and the position of the rectangle L may be determined, for example, by applying object recognition to the training multi-channel image illustrated in FIG. 20. Alternatively, the size and the position of the rectangle L may be determined based on the data that is input by a user or the like who refers to the training multi-channel image illustrated in FIG. 20 using the mouse 351, the keyboard 352, and the like.

The machine learning implementing unit 302 trains a machine learning model 400M by inputting the training data to the machine learning model 400M mounted in the machine learning device 400. The machine learning model 400M is, for example, a convolutional neural network (CNN).

Figure 21:
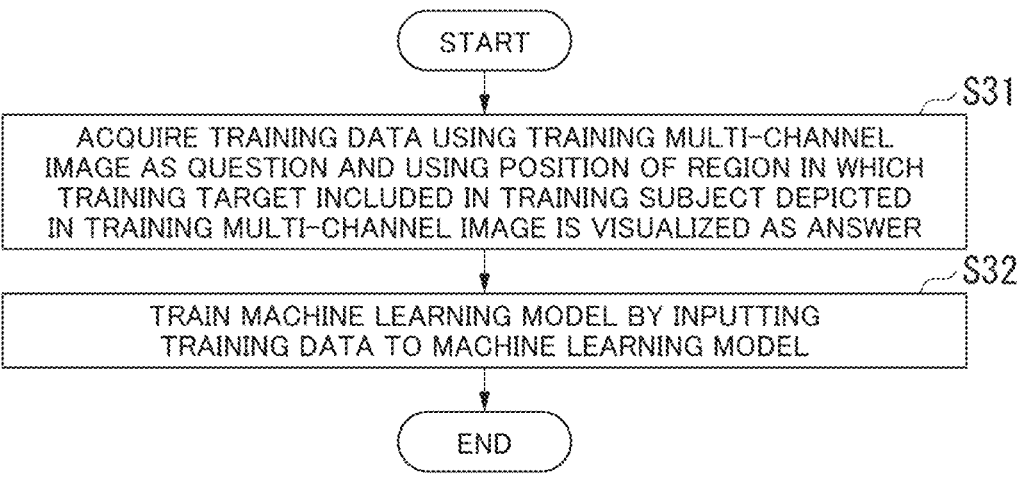
FIG. 21 is a flowchart illustrating an example of a process that is performed by the machine learning implementation device according to the second embodiment.

Next, an example of a process performed by the machine learning implementation device according to the second embodiment will be described with reference to FIG. 21. FIG. 21 is a flowchart illustrating an example of a process performed by the machine learning implementation device according to the second embodiment.

In Step S31, the training data acquiring unit 301 acquires training data using, as a question, training multi-channel image and using, as an answer, the position of a region where a training target included in the training subject depicted in the training multi-channel image is visualized.

In Step S32, the machine learning implementing unit 302 trains the machine learning model 400M by inputting the training data to the machine learning model 400M.

Next, hardware constituting the target detection device according to the second embodiment and hardware attached to the target detection device will be described with reference to FIG. 22.

Figure 22:
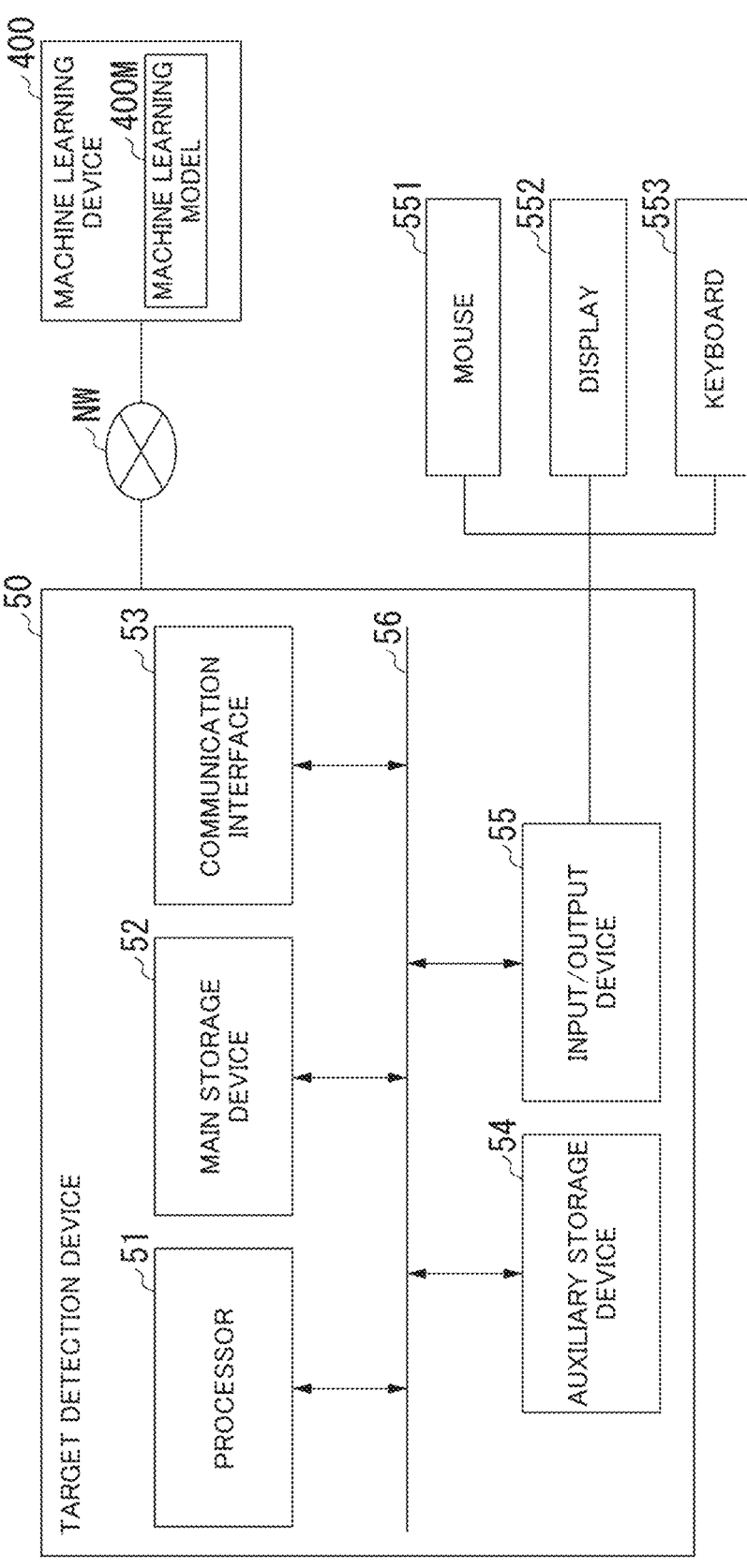
FIG. 22 is a diagram illustrating an example of a hardware configuration of a target detection device according to the second embodiment.

FIG. 22 is a diagram illustrating an example of the hardware configuration of the target detection device according to the second embodiment. As illustrated in FIG. 22, the target detection device 50 has a processor 51, a main storage device 52, a communication interface 53, an auxiliary storage device 54, an input/output device 55, and a bus 56.

The processor 51 is, for example, a CPU and implements each function of the target detection device 50 by reading and executing a target detection program. The processor 51 may also implement functions required for implementing each function of the target detection device 50 by reading and executing a program other than the target detection program.

The main storage device 52 is, for example, a RAM and stores in advance the target detection program and other programs that are read and executed by the processor 51.

The communication interface 53 is an interface circuit for executing communication with the machine learning device 400 and other devices via a network NW. The network NW is, for example, a WAN, a LAN, the Internet, or an intranet.

The auxiliary storage device 54 is, for example, a hard disk drive (HDD), a solid-state drive (SSD), a flash memory, or a ROM.

The input/output device 55 is, for example, an input/ output port. The input/output device 55 is connected to, for example, a mouse 551, a display 552, and a keyboard 553 illustrated in FIG. 22. The mouse 551 and the keyboard 553 are used, for example, for the task of inputting data required for operating the target detection device 50. The display 552 is, for example, a liquid crystal display. The display 552 displays, for example, a graphical user interface of the target detection device 50.

Figure 23:
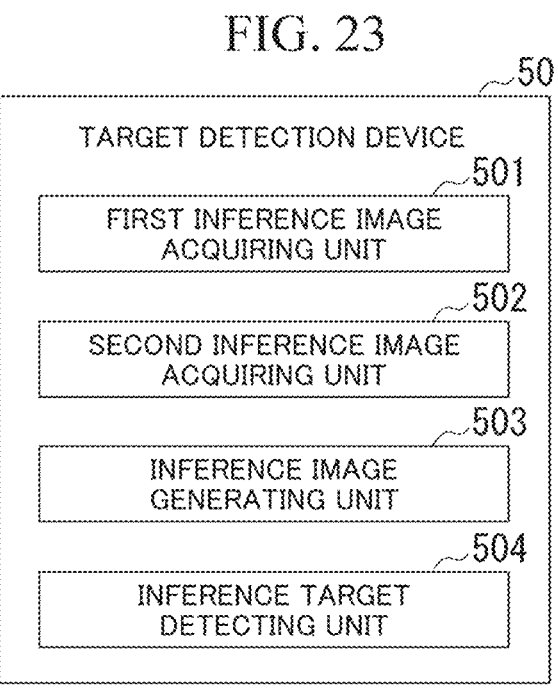
FIG. 23 is a diagram illustrating an example of a functional configuration of the target detection device according to the second embodiment.

Next, processes performed by the target detection device according to the second embodiment will be described with reference to FIG. 23. FIG. 23 is a diagram illustrating an example of a functional configuration of the target detection device according to the second embodiment. As illustrated in FIG. 23, the target detection device 50 has a first inference image acquiring unit 501, a second inference image acquiring unit 502, an inference image generating unit 503, and an inference target detecting unit 504.

The first inference image acquiring unit 501 acquires a first inference image depicting an inference subject, which is generated by irradiating the inference subject with light belonging to the first wavelength group. The second inference image acquiring unit 502 acquires a second inference image depicting the inference subject, which is generated by irradiating the inference subject with light belonging to the second wavelength group. The inference subject mentioned herein is, for example, a chicken thigh.

The inference image generating unit 503 generates an inference multi-channel image using the first inference image and the second inference image. For example, the inference image generating unit 503 generates the inference multi-channel image by performing the composite process described above on the first inference image and the second inference image.

The inference target detecting unit 504 causes a machine learning model to detect an inference target included in the inference subject by inputting the inference multi-channel image to the machine learning model 400M that has been trained by the machine learning implementation device 30. The inference target mentioned herein is a knee cartilage part included in a chicken thigh when the inference subject is the chicken thigh.

Figure 24:
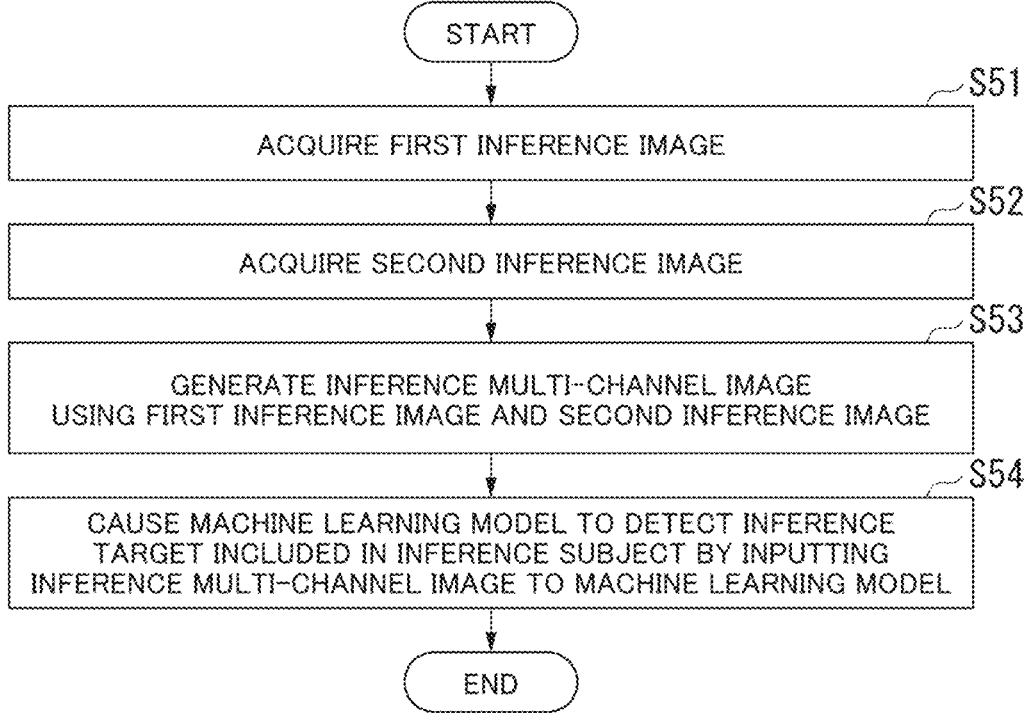
FIG. 24 is a flowchart illustrating an example of a process that is performed by the target detection device according to the second embodiment.

An example of a process performed by the target detection device according to the second embodiment will be described with reference to FIG. 24. FIG. 24 is a flowchart illustrating an example of the process performed by the target detection device according to the second embodiment.

In Step S51, the first inference image acquiring unit 501 acquires a first inference image.

In Step S52, the second inference image acquiring unit 502 acquires the second inference image.

In Step S53, the inference image generating unit 503 generates an inference multi-channel image using the first inference image and the second inference image.

In Step S54, the inference target detecting unit 504 causes the machine learning model to detect an inference target included in the inference subject by inputting the inference multi-channel image to the machine learning model.

The machine learning implementation device, the target detection device, the machine learning implementation program, and the target detection program according to the second embodiment have been described above.

The machine learning implementation device 30 is equipped with the training data acquiring unit 301 and the machine learning implementing unit 302. The training data acquiring unit 301 acquires training data using, as a question, a training multi-channel image that is generated using a first training image and a second training image and using as an answer, the position of a region where a training target included in a training subject depicted in the training multi-channel image is visualized. The machine learning implementing unit 302 trains the machine learning model 400M by inputting the training data to the machine learning model 400M.

Accordingly, the machine learning implementation device 30 can generate a machine learning model 400M that performs the same process as the target detection device 10 according to the first embodiment.

The target detection device 50 is equipped with the first inference image acquiring unit 501, the second inference image acquiring unit 502, the inference image generating unit 503, and the inference target detecting unit 504. The first inference image acquiring unit 501 acquires a first inference image depicting an inference subject, which is generated by irradiating the inference subject with light belonging to the first wavelength group. The second inference image acquiring unit 502 acquires a second inference image depicting the inference subject, which is generated by irradiating the inference subject with light belonging to the second wavelength group. The inference image generating unit 503 generates an inference multi-channel image using the first inference image and the second inference image. The inference target detecting unit 504 causes a machine learning model 400M to detect an inference target included in the inference subject by inputting the inference multi-channel image to the machine learning model 400M that has been trained by the machine learning implementation device 30.

Accordingly, the target detection device 50 can detect an inference target included in an inference subject depicted in an inference multi-channel image using the machine learning model 400M that performs the same process as the target detection device 10 according to the first embodiment.

In the first embodiment described above, an example in which the target detection device 10 illustrated in FIG. 1 is implemented by the processor 11 that reads and executes the target detection program has been described, but the present invention is not limited thereto. At least a part of the target detection device 10 illustrated in FIG. 1 may be implemented by hardware including a circuit unit (circuitry) such as a large-scale integration (LSI), an application-specific integrated circuit (ASIC), a field-programmabthighate array (FPGA), or a graphics processing unit (GPU). Alternatively, at least part of the target detection device 10 illustrated in FIG. 1 may be implemented by the cooperation of software and hardware. These hardware may be integrated into a single piece or may be divided into multiple pieces.

Similarly, in the second embodiment described above, an example in which the machine learning implementation device 30 illustrated in FIG. 18 is implemented by the processor 31 that reads and executes the machine learning implementation program has been described, but the present invention is not limited thereto. At least a part of the machine learning implementation device 30 illustrated in FIG. 18 may be implemented by hardware including a circuit unit such as an LSI, an ASIC, an FPGA, or a GPU. Alternatively, at least part of the machine learning implementation device 30 illustrated in FIG. 18 may be implemented by the cooperation of software and hardware. These hardware may be integrated into a single piece or may be divided into multiple pieces.

In the second embodiment described above, an example in which the target detection device 50 illustrated in FIG. 22 is implemented by the processor 51 that reads and executes the target detection program has been described, but the present invention is not limited thereto. At least a part of the target detection device 50 illustrated in FIG. 22 may be implemented by hardware including a circuit unit such as an LSI, an ASIC, an FPGA, or a GPU. Alternatively, at least part of the target detection device 50 illustrated in FIG. 22 may be implemented by the cooperation of software and hardware. These hardware may be integrated into a single piece or may be divided into multiple pieces.

In the first embodiment described above, an example in which the first light emitting device 154 includes an LED has been described, but the present invention is not limited thereto. The first light emitting device 154 may include a light source and an optical filter for attenuating a part of wavelength components included in light emitted from the light source. In the embodiment described above, an example in which the second light emitting device 156 includes an LED has been described, but the present invention is not limited thereto. The second light emitting device 156 may include a light source and an optical filter for attenuating a part of wavelength components included in light emitted from the light source. Examples of the light source include a xenon lamp and a deuterium lamp.

The first image acquiring unit 102 may also acquire an image other than the first image generated using the first main image and the first subordinate image as a first image. That is, the first image acquiring unit 102 does not necessarily have to acquire the first image in which each pixel represents a value calculated based on the luminance of each pixel included in the first main image and the luminance of each pixel included in the first subordinate image. For example, the first image acquiring unit 102 may acquire an image that is captured by irradiating a subject with light having a wavelength belonging to the first wavelength group as the first image.

The first image acquiring unit 102 may also acquire a first image in which each pixel represents a value calculated based on the luminance of each pixel included in the first main image other than the aforementioned first main image and the luminance of each pixel included in a first subordinate image other than the aforementioned first subordinate image. Here, a first main image other than the aforementioned first main image is, for example, a first main image depicting a subject, which is captured by irradiating the subject with light having a first main wavelength belonging to the first wavelength group and detecting the reflected light. Here, a first subordinate image other the aforementioned first subordinate image is a first subordinate image depicting the subject, which is captured by irradiating the subject with light having a first subordinate wavelength belonging to the first wavelength group and detecting the reflected light.

The second image acquiring unit 104 may also acquire an image other than the second image generated using the second main image and the second subordinate image as a second image. That is, the second image acquiring unit 104 does not necessarily have to acquire the second image in which each pixel represents a value calculated based on the luminance of each pixel included in the second main image and the luminance of each pixel included in the second subordinate image. For example, the second image acquiring unit 104 may acquire an image that is captured by irradiating a subject with light having a wavelength belonging to the second wavelength group as the second image.

The second image acquiring unit 104 may also acquire a second image in which each pixel represents a value calculated based on the luminance of each pixel included in a second main image other than the aforementioned second main image and the luminance of each pixel included in a second subordinate image other than the aforementioned second subordinate image. Here, the second main image other than the aforementioned second main image is, for example, a second main image depicting a subject, which is captured by detecting light of a second main wavelength emitted from by the subject by irradiating the subject with light having a wavelength belonging to the second wavelength group. Here, the second main image other the aforementioned second main image is, for example, a second subordinate image depicting the subject, which is captured by detecting light having a second subordinate wavelength emitted from the subject irradiated with light belonging to the second wavelength group.

The first image acquiring unit 102 does not necessarily have to acquire the first image generated by detecting light reflected by the subject with a light receiving element. For example, the first image acquiring unit 102 may acquire the first image generated by detecting light transmitted through the subject with a light receiving element.

The second image acquiring unit 104 does not necessarily have to acquire the first image generated by detecting light reflected by the subject with a light receiving element. For example, the second image acquiring unit 104 may acquire the second image generated by detecting light transmitted through the subject with a light receiving element.

In the first embodiment and the second embodiment described above, an example in which the subject is a chicken thigh and a target to be detected is a knee cartilage part has been described, but the present invention is not limited thereto.

For example, the subject may be a package of foods or the like, and the target to be detected may be characters, patterns, or the like printed on the package. In this case, it is preferable that both the first wavelength group and the second wavelength group include wavelengths belonging to a visible light range.

Alternatively, the subject may be foods, and the target to be detected may be hair mixed into the foods. In this case, since hair emits fluorescence in response to light belonging to an ultraviolet light range and has an absorption peak characteristic to an infrared light range, it is preferable that both the first wavelength group and the second wavelength group include wavelengths belonging to the ultraviolet light range or the infrared light range.

Alternatively, the subject may be foods, and the target to be detected may be a part in a frozen state different from that of the other part. In this case, since a wavelength with an absorption peak in the infrared light range changes depending on the difference in the frozen state, it is preferable that both the first wavelength group and the second wavelength group include wavelengths belonging to the infrared light range.

Alternatively, the subject may be a hamburger and the target to be detected may be a top surface or a bottom surface of the hamburger. In this case, since there is a difference in absorbance between a part with a burn mark and a part without a burn mark, it is preferable that one of the first wavelength group and the second wavelength group includes a wavelength of 1200 nm belonging to the near-infrared light range while the other includes a wavelength of 600 nm belonging to the visible light range.

Alternatively, the subject may be a dumpling, and the target to be detected may be a filling of the dumpling. In this case, since an absorbance peak by the filling of the dumpling exists in the near-infrared light range, it is preferable that a wavelength belonging to the near-infrared light range is included in the first wavelength group or the second wavelength group. In this case, since an absorbance peak by the filling of the dumpling exists in the visible light range, it is preferable that a wavelength belonging to the visible light range is included in the first wavelength group or the second wavelength group.

Embodiments of the present invention have been described in detail with reference to the drawings. However, the specific configurations of the embodiments of the present invention are not limited to the embodiments described above, and at least one of various combinations, modifications, substitutions, and design changes without departing from the gist of the present invention may be added to the aforementioned embodiment described above.

The advantageous effects of the invention in the embodiments described above are the effects shown as examples. Accordingly, the present invention can also achieve other advantages that can be recognized by those skilled in the art from the description of the embodiments described above in addition to the aforementioned advantageous effects.

REFERENCE SIGNS LIST

10 Target detection device
11 Processor
12 Main storage device
13 Communication interface
14 Auxiliary storage device
15 Input/output device
16 Bus
101 First image generating unit
102 First image acquiring unit
103 Second image generating unit
104 Second image acquiring unit
105 Target detecting unit
151 Mouse
152 Keyboard
153 Display
154 First light emitting device
155 First imaging device
156 Second light emitting device
157 Second imaging device
20 Food processing line
200 Control device
201 Belt conveyor
202, 203 Photoelectric sensor
M Chicken thigh
30 Machine learning implementation device
31 Processor
32 Main storage device
33 Communication interface
34 Auxiliary storage device
35 Input/output device
36 Bus
301 Training data acquiring unit
302 Machine learning implementing unit
351 Mouse
352 Keyboard
353 Display
400 Machine learning device
400M Machine learning model
50 Target detection device
51 Processor
52 Main storage device
53 Communication interface
54 Auxiliary storage device
55 Input/output device
56 Bus
501 First inference image acquiring unit
502 Second inference image acquiring unit
503 Inference image generating unit
504 Inference target detecting unit
551 Mouse
552 Display
553 Keyboard

What is claimed is:

1. A target detection device comprising:
a first image acquiring unit configured to acquire a first image depicting a subject, which is generated by irradiating the subject with light belonging to a first wavelength group;
a second image acquiring unit configured to acquire a second image depicting the subject, which is generated by irradiating the subject with light belonging to a second wavelength group other than the first wavelength group and having a different wavelength from the light with which the subject has been irradiated to generate the first image; and a target detecting unit configured to detect a target included in the subject using the first image and the second image, wherein, at least one of the first image acquiring unit or the second image acquiring unit is configured to acquire an image in which each pixel represents a value calculated based on a luminance of a main image and a luminance of a subordinate image, the luminance of the main image obtained as a result of irradiating the subject with light belonging to the first wavelength group or the second wavelength group, the main image being obtained based on a main wavelength belonging to the same wavelength group as the light irradiated to the subject, the luminance of the subordinate image obtained as a result of irradiating the subject with light belonging to the first wavelength group or the second wavelength group, the subordinate image being obtained based on a subordinate wavelength belonging to the same wavelength group as the light irradiated to the subject and has a different wavelength from the main wavelength.

2. The target detection device according to claim 1, wherein the target detecting unit detects the target by detecting a first element that is visualized with a luminance higher than a predetermined first luminance in the first image and detecting a second element that is visualized with a luminance higher than a predetermined second luminance in the second image and is different from the first element.

3. The target detection device according to claim 2, wherein the first image acquiring unit acquires the first image that is generated by irradiating the subject with light having a wavelength whose reflectance is higher than a predetermined first reflectance when the first element is irradiated with the light.

4. The target detection device according to claim 2, wherein the second image acquiring unit acquires the second image that is generated by irradiating the subject with light having a wavelength whose reflectance is higher than a predetermined second reflectance when the second element is irradiated with the light.

5. The target detection device according to claim 2, wherein the target detecting unit selects a first point in each region where the first element is visualized in the first image based on a predetermined first rule, selects a second point in each region where the second element is visualized in the second image based on a predetermined second rule, and detects a combination of the first element and the second element that determines the first point and the second point so that the length of a line segment connecting the first point and the second point is less than a predetermined length, as the target.

6. The target detection device according to claim 1, wherein the first image acquiring unit acquires the first image in which each pixel represents a value calculated based on the luminance of each pixel included in a first main image depicting the subject, which is captured by irradiating the subject with light having a first main wavelength belonging to the first wavelength group and detecting the reflected light, and the luminance of each pixel included in a first subordinate image depicting the subject, which is captured by irradiating the subject with light having a first subordinate wavelength belonging to the first wavelength group and detecting the reflected light.

7. The target detection device according to claim 1, wherein the second image acquiring unit acquires the second image in which each pixel represents a value calculated based on the luminance of each pixel included in a second main image depicting the subject, which is captured by irradiating the subject with light having a second main wavelength belonging to the second wavelength group and detecting the reflected light, and the luminance of each pixel included in a second subordinate image depicting the subject, which is captured by irradiating the subject with light having a second subordinate wavelength belonging to the second wavelength group and detecting the reflected light.

8. The target detection device according to claim 1, wherein the first image acquiring unit acquires the first image in which each pixel represents a value calculated based on the luminance of each pixel included in a first main image depicting the subject, which is captured by irradiating the subject with light belonging to the first wavelength group and detecting light having a first main wavelength emitted from the subject, and the luminance of each pixel included in a first subordinate image depicting the subject, which is captured by irradiating the subject with light belonging to the first wavelength group and detecting light having a first subordinate wavelength emitted from the subject.

9. The target detection device according to claim 1, wherein the second image acquiring unit acquires the second image in which each pixel represents a value calculated based on the luminance of each pixel included in a second main image depicting the subject, which is captured by irradiating the subject with light belonging to the second wavelength group and detecting light having a second main wavelength emitted from the subject, and the luminance of each pixel included in a second subordinate image depicting the subject, which is captured by irradiating the subject with light belonging to the second wavelength group and detecting light having a second subordinate wavelength emitted from the subject.

10. A non-transitory computer-readable storage medium storing a target detection program causing a computer to perform:

a first image acquiring function to acquire a first image depicting the subject, which is generated by irradiating a subject with light belonging to a first wavelength group;

a second image acquiring function to acquire a second image depicting the subject, which is generated by irradiating the subject with light belonging to a second wavelength group other than the first wavelength group and having a different wavelength from the light with which the subject has been irradiated to generate the first image; and a target detecting function to detect a target included in the subject using the first image and the second image, wherein, at least one of the first image acquiring function or the second image acquiring function is configured to acquire an image in which each pixel represents a value calculated based on a luminance of a main image and a luminance of a subordinate image, the luminance of the main image obtained as a result of irradiating the subject with light belonging to the first wavelength group or the second wavelength group, the main image being obtained based on a main wavelength belonging to the same wavelength group as the light irradiated to the subject, the luminance of the subordinate image obtained as a result of irradiating the subject with light belonging to the first wavelength group or the second wavelength group, the subordinate image being obtained based on a subordinate wavelength belonging to the same wavelength group as the light irradiated to the subject and has a different wavelength from the main wavelength.

* * * * *